(12) United States Patent
Sato et al.

(10) Patent No.: US 6,390,598 B2
(45) Date of Patent: May 21, 2002

(54) NON-UNIFORM OVERLAPPING PRINTING

(75) Inventors: Akito Sato; Koichi Otsuki, both of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/840,132

(22) Filed: Apr. 24, 2001

(30) Foreign Application Priority Data

Apr. 25, 2000 (JP) ......................................... 2000-123814
Aug. 18, 2000 (JP) ......................................... 2000-248743

(51) Int. Cl.$^7$ ................................................. B41J 2/15

(52) U.S. Cl. ........................................... 347/41; 347/16

(58) Field of Search ............................... 347/41, 9, 15, 347/16, 43, 40, 12

(56) References Cited

U.S. PATENT DOCUMENTS

| | | | | |
|---|---|---|---|---|
| 4,198,642 A | | 4/1980 | Gamblin | 347/41 |
| 6,190,001 B1 | * | 2/2001 | Saruta | 347/41 |
| 6,203,134 B1 | * | 3/2001 | Kakutani et al. | 347/15 |
| 6,217,149 B1 | * | 4/2001 | Takagi et al. | 347/41 |

* cited by examiner

Primary Examiner—Lamson D. Nguyen
(74) Attorney, Agent, or Firm—Oblon, Spivak, McClelland, Maier & Neustadt, P.C.

(57) ABSTRACT

A printing method drives each of the n(j) number of nozzles to enable the nozzle to form dots intermittently at a rate of one in m×q dot positions on the j-th main scan line during one main scan, where m is an integer of 1 or more, and q is an integer of 2 or more, to thereby complete dot formation on the j-th main scan line with the n(j) number of nozzles during n(j) number of main scans. The printing method attains high recording speed and high image quality, comparing to cases when all main scan lines are recorded using a fixed number of nozzles.

40 Claims, 32 Drawing Sheets

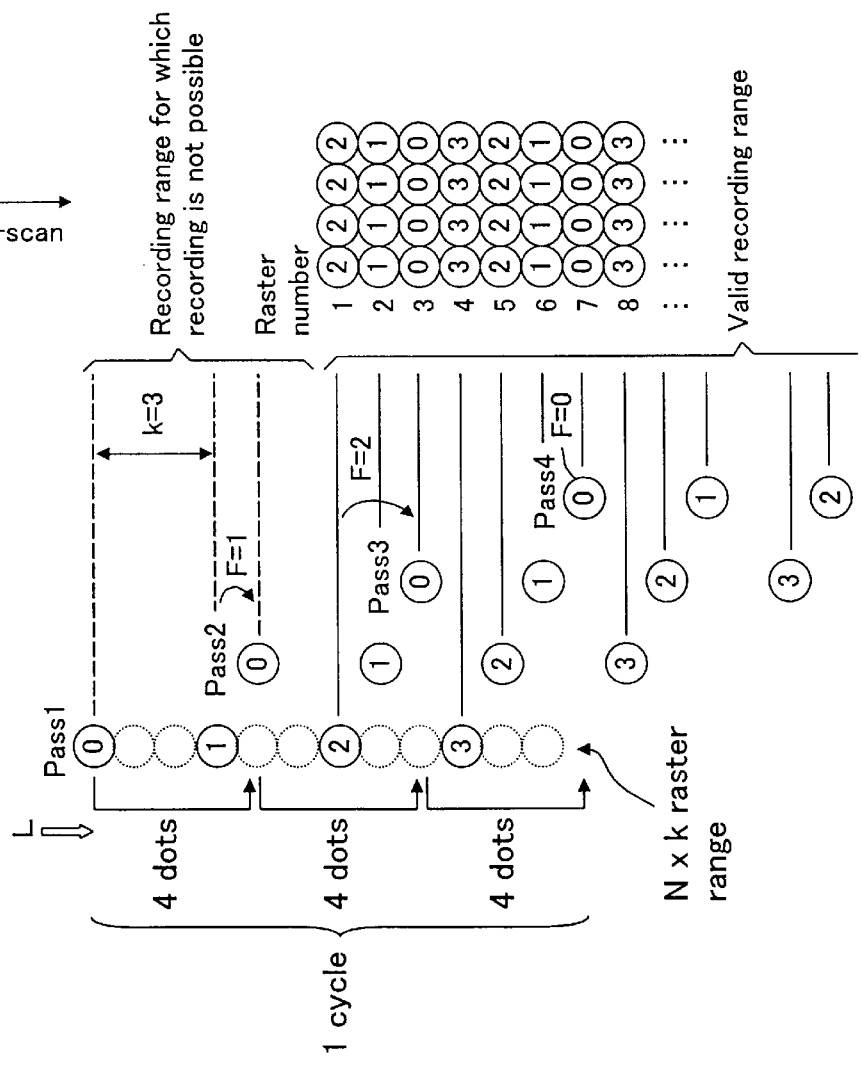

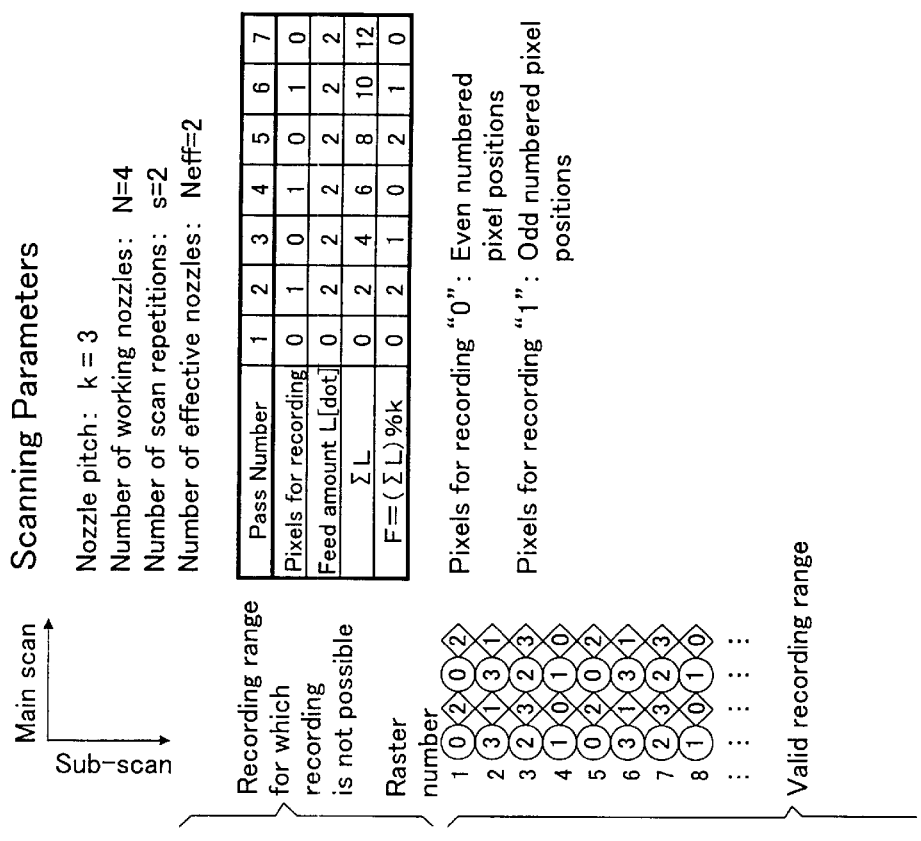
Fig.6(B) Scanning Parameters
Nozzle pitch: k = 3
Number of working nozzles: N=4
Number of scan repetitions: s=2
Number of effective nozzles: Neff=2
| Pass Number | 1 | 2 | 3 | 4 | 5 | 6 | 7 |
|---|---|---|---|---|---|---|---|
| Pixels for recording | 0 | 1 | 0 | 1 | 0 | 1 | 0 |
| Feed amount L[dot] | 0 | 2 | 2 | 2 | 2 | 2 | 2 |
| ΣL | 0 | 2 | 4 | 6 | 8 | 10 | 12 |
| F=(ΣL)%k | 0 | 2 | 1 | 0 | 2 | 1 | 0 |
Pixels for recording "0": Even numbered pixel positions
Pixels for recording "1": Odd numbered pixel positions
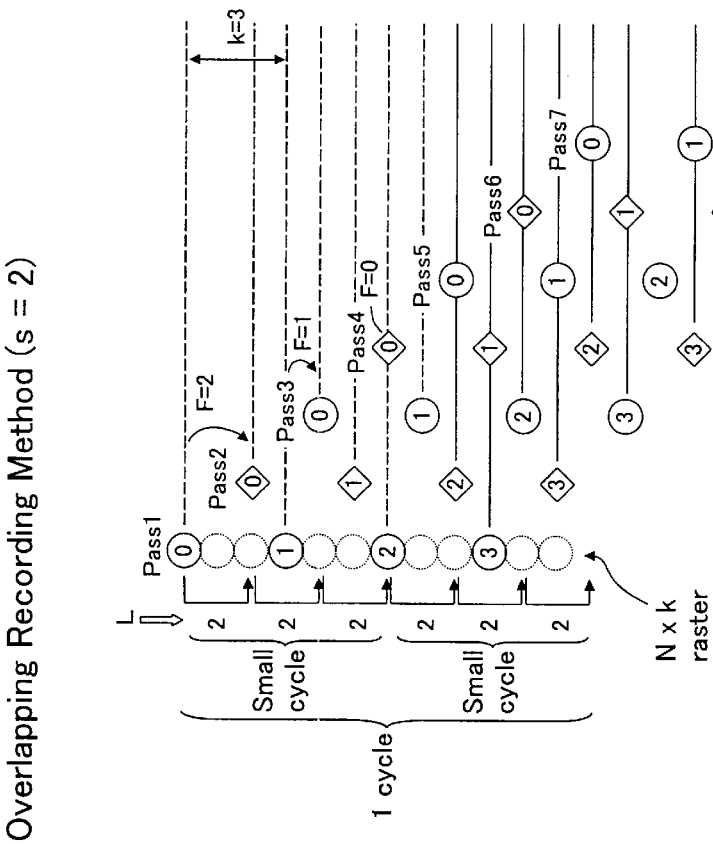
Fig.6(A) Overlapping Recording Method (s = 2)

Non-overlapping

Overlapping
(when forming dots on odd numbered pixel positions)

Overlapping
(when forming dots on even numbered pixel positions)

Raster data allocated to each nozzle for each pixel position
(comparative example)

| Raster direction pixel position number | 1 | 2 | 3 | 4 | 5 | 6 | 7 | 8 |
|---|---|---|---|---|---|---|---|---|
| Raster data of the first raster | 1 | 1 | 1 | 0 | 0 | 1 | 1 | 1 |
| Raster data of nozzle #1 | – | 1 | – | 0 | – | 1 | – | 1 |
| Raster data of nozzle #4 | 1 | – | 1 | – | 0 | – | 1 | – |
| Raster data of the second raster | 1 | 1 | 1 | 1 | 1 | 1 | 1 | 1 |
| Raster data of nozzle #2 | – | 1 | – | 1 | – | 1 | – | 1 |
| Raster data of nozzle #5 | 1 | – | 1 | – | 1 | – | 1 | – |
| Raster data of the third raster | 1 | 0 | 1 | 0 | 0 | 1 | 1 | 0 |
| Raster data of nozzle #3 | – | 0 | – | 0 | – | 1 | – | 0 |
| Raster data of nozzle #6 | 1 | – | 1 | – | 0 | – | 1 | – |

"–": Pixel positions for which data cannot be allocated
1: Recording
0: No recording

Fig. 11(B)

Raster data allocated to each nozzle for each pixel position
(first working embodiment)

| Raster direction pixel position number | 1 | 2 | 3 | 4 | 5 | 6 | 7 | 8 |
|---|---|---|---|---|---|---|---|---|
| Raster data of the first raster | 1 | 1 | 1 | 1 | 0 | 1 | 1 | 1 |
| Raster data of nozzle #1 | – | 0* | – | 1 | – | 0* | – | 1 |
| Raster data of nozzle #4 | 1 | – | 1 | – | 0 | – | 1 | – |
| Raster data of nozzle #7 | – | 1 | – | 0* | – | 1 | – | 0* |
| Raster data of the second raster | 1 | 1 | 1 | 1 | 1 | 1 | 1 | 1 |
| Raster data of nozzle #2 | – | 1 | – | 1 | – | 1 | – | 1 |
| Raster data of nozzle #5 | 1 | – | 1 | – | 1 | – | 1 | – |
| Raster data of the third raster | 1 | 0 | 1 | 0 | 0 | 1 | 1 | 0 |
| Raster data of nozzle #3 | – | 0 | – | 0 | – | 1 | – | 0 |
| Raster data of nozzle #6 | 1 | – | 1 | – | 0 | – | 1 | – |

"–": Pixel positions for which data cannot be allocated
1: Recording
0: No recording
0*: Dummy data

Fig. 18

Main scanning direction →
Sub-scanning direction ↓

Sixth Embodiment (pass and raster relationship)

Nozzle pitch: k = 2
Number of working nozzles: N = 22
Sub-scan feed amount: L = 3 dots
Intermittence level q: = 4
Recording target pixel ratio:
   Nozzles # 1 to 10, 13 to 22: 0.125 (m = 2)
   Nozzles # 11, 12: 0.25 (m = 1)

Pixel position number

| Raster number | 1 | 2 | 3 | 4 | 5 | 6 | 7 | 8 | Number of working nozzles |
|---|---|---|---|---|---|---|---|---|---|
| 1 | 22 | 19 | 16 | 13 | 10 | 7 | 4 | 1 | Eight |
| 2 | 21 | 18 | 15 | 12 | 9 | 6 | 3 | 12 | Seven |
| 3 | 11 | 20 | 17 | 14 | 11 | 8 | 5 | 2 | Seven |
| 4 | 22 | 19 | 16 | 13 | 10 | 7 | 4 | 1 | Eight |
| 5 | 12 | 21 | 18 | 15 | 12 | 9 | 6 | 3 | Seven |
| 6 | 11 | 20 | 17 | 14 | 11 | 8 | 5 | 2 | Seven |
| 7 | 1 | 22 | 19 | 16 | 13 | 10 | 7 | 4 | Eight |
| 8 | 12 | 21 | 18 | 15 | 12 | 9 | 6 | 3 | Seven |
| 9 | 2 | 11 | 20 | 17 | 14 | 11 | 8 | 5 | Seven |
| 10 | 1 | 22 | 19 | 16 | 13 | 10 | 7 | 4 | Eight |
| 11 | 3 | 12 | 21 | 18 | 15 | 12 | 9 | 6 | Seven |
| 12 | 2 | 11 | 20 | 17 | 14 | 11 | 8 | 5 | Seven |

Fig. 24 Tenth Embodiment

Fig. 26

Eleventh Embodiment (pass 2 through pass 12)

Number of working nozzles: N = 36
Nozzle pitch: k = 4
Sub-scan feed amount:
L = 19-15-15-15 dot cycle variable feed
Lave = 16 dots
R = 5

For one Main scan
○ : Nozzles which print all odd numbered rows or all even numbered rows
◎ : Nozzles that print only one of every four rows Fig. 28  Twelfth Working Example (pass 1 through pass 9)

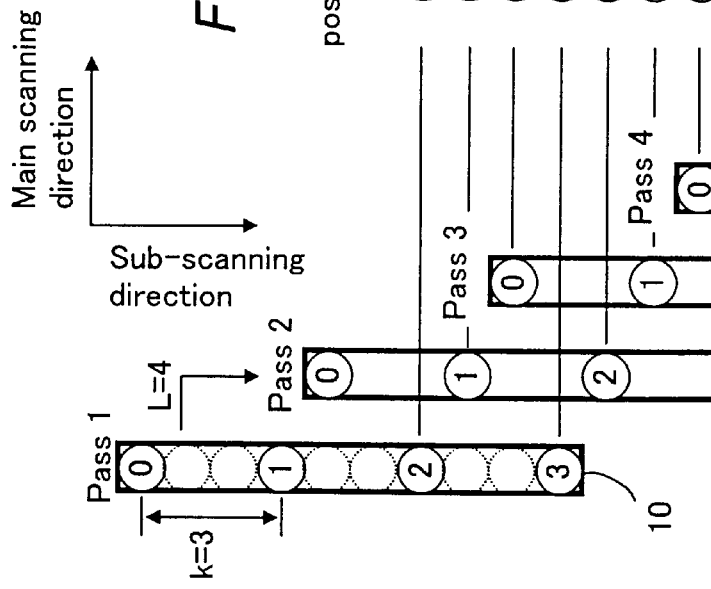
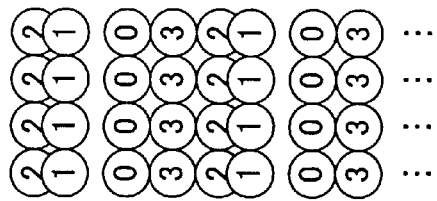
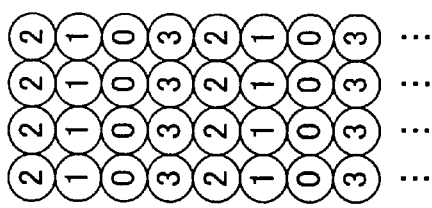
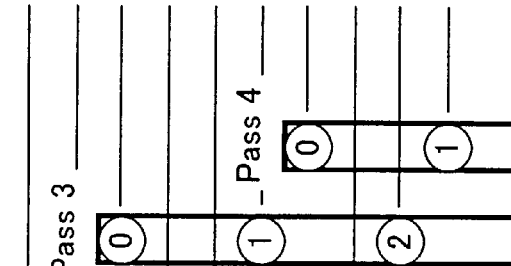
Fig. 31(A) Interlace Recording Method (Non-Overlapping) Sub-scan Feed
Fig. 31(B) When the dot positions are correct
Fig. 31(C) When the #1 nozzle dots are shifted upward

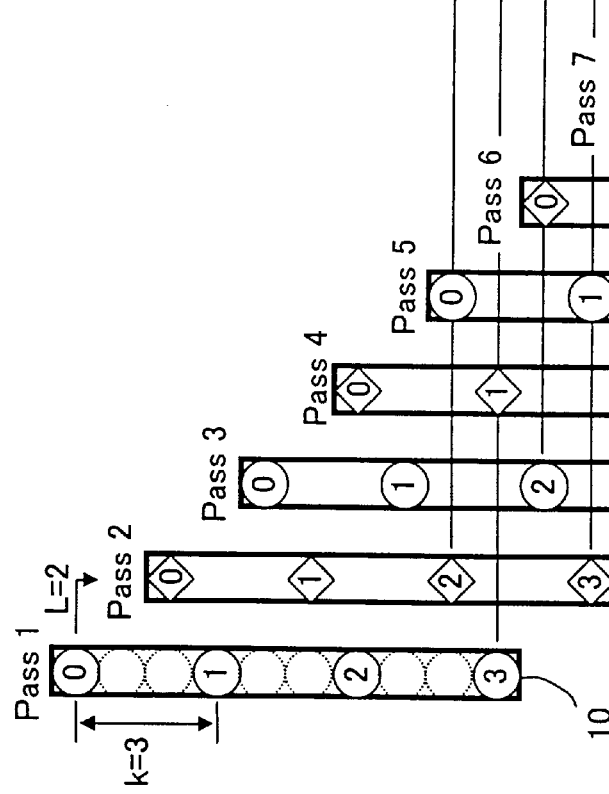
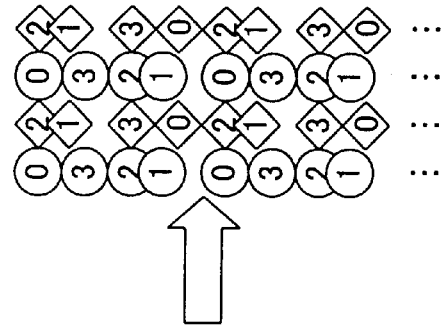
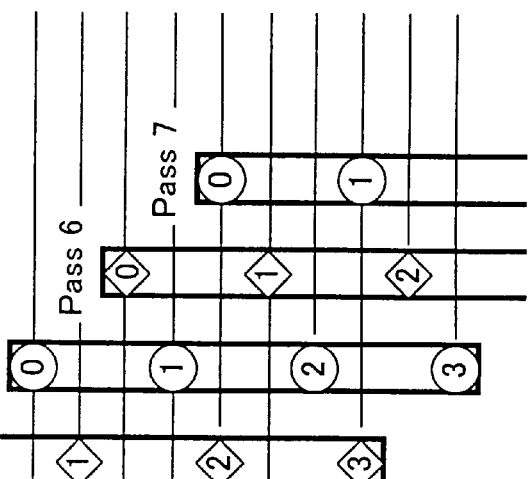
Fig. 32(A) Interlace Recording Method (Overlapping) Sub-scan Feed
Fig. 32(B) When the dot positions are correct
Fig. 32(C) When the #1 nozzle dots are shifted upward

NON-UNIFORM OVERLAPPING PRINTING

BACKGROUND OF THE INVENTION

1. Field of the Invention

The present invention relates to a technology that performs printing by forming dots on a printing medium using a printing head.

2. Description of the Related Art

Inkjet printers such as serial scan type printers and drum scan type printers perform printing using a printing head while scanning in a main scan direction, and form text and images on a printing medium by ejecting ink from multiple nozzles of a printing head.

As one dot recording method used with inkjet printers, there is a method called the "interlace method." FIG. 31(A) is an explanatory diagram that shows sub-scan feed for an interlace recording method. Printing head 10 has four nozzles placed along the sub-scanning direction. The numbers 0 through 3 noted in the circles are the nozzle numbers. Nozzle pitch k in the sub-scanning direction between nozzles is 3 dots. Here, a unit called a "dot" means a dot pitch in the sub-scanning direction that correlates to a printing resolution in the sub-scanning direction. In FIG. 31(A), the positions of printing head 10 noted as pass 1, pass 2, etc. indicate the sub-scanning direction position at the time of each main scan. Here, "pass" means one main scan. After each main scan, sub-scan feed is executed at a four dot fixed feed amount L.

FIG. 31(B) shows the ordinal numbers of the nozzles that record dots on each main scan line. As can be understand from this Figure, with the interlace recording method, even when the nozzle pitch k is 2 dots or greater, dots can be formed on all main scan lines.

However, the positions of dots formed by each nozzle sometimes shift a little bit in the sub-scanning direction due to nozzle manufacturing error. FIG. 31(B) shows a case where there is no such manufacturing error and all the dot positions are normal. Meanwhile, in a case when a dot formed by nozzle #1 is shifted vertically, for example, as shown in FIG. 31(C), a gap occurs between the main scan line formed by dots from nozzle #1 and the main scan line formed by dots made by nozzle #0. With the naked eye, this kind of gap is observed as a stripe shaped area of image quality degradation called "banding." Note that the cause of banding is not just nozzle manufacturing errors, but may include other errors such as sub-scan feed error, folds in the printing medium, etc.

To prevent this kind of banding, a recording method called an overlapping recording method is used. FIGS. 32(A) through 32(C) show the effect of the overlapping recording method. As shown in FIG. 32(A), the sub-scan feed amount L for this recording method is a fixed value of two dots. In FIGS. 32(A) through (C), the nozzle positions of the even numbered passes are shown by a diamond shape. When all the dot positions are normal, as shown in FIG. 32(B), the dot position recorded on even numbered passes are placed alternately with the dot positions recorded on odd numbered passes without any gaps. As a result, the dots on the same main scan line are formed by two different nozzles. In this way, this method of recording using multiple different nozzles to record multiple dots on the same main scan line is called an "overlapping method."

With an overlapping method, as shown in FIG. 32(C), where dots formed by nozzle #1 are shifted vertically as well, we can see that the gap does not stand out as much as in FIG. 31(C). As a result, it is possible to soften the banding. To make the most of this advantage of this kind of overlapping method, it is desirable to make the number of overlaps (in other words, the number of nozzles in charge of forming dots on each main scan line) as big a value as possible.

However, the overlapping method has the problem that printing speed is slower than with non-overlapping methods. The sub-scan feed amount L in the non-overlapping method shown in FIG. 31 is four dots, while that in the overlapping method shown in FIG. 32(A) is two dots. The printing speed is approximately proportional to the sub-scan feed amount, so the printing speed of this overlapping method is approximately half that of the non-overlapping method.

With inkjet printers, there is demand for high speed printing of images at the same level of smoothness as a photograph. Achieving higher image quality can be achieved to some degree by making the dots smaller. However, when the dots are smaller, there is a tendency for the banding due to variance in nozzle characteristics to stand out more. Meanwhile, to soften this kind of banding, when the number of overlaps is increased, there is the problem that printing speed is decreased.

SUMMARY OF THE INVENTION

Accordingly, an object of the present invention is to increase image quality without excessively decreasing printing speed.

In order to attain the above and the other objects of the present invention, there is provided a method of printing by forming ink dots on a print medium. The printing method comprises the steps of providing a print head having a plurality of nozzles arrayed along a sub-scanning direction for ejecting same ink; allocating n(j) number of nozzles to a j-th main scan line in a selected area on the print medium where n(j) is an integer of two or more, the integer n(j) for some main scan lines being set at a different value from that for other main scan lines; positioning each of the n(j) number of nozzles on the j-th main scan line; and driving each of the n(j) number of nozzles, in response to given print data, to enable the nozzle to form dots intermittently at a rate of one in m×q dot positions on the j-th main scan line during one main scan, m being an integer of 1 or more, and q being an integer of 2 or more, to thereby complete dot formation on the j-th main scan line with the n(j) number of nozzles during n(j) number of main scans.

In the printing method of the present invention, the numbers of nozzles in charge of recording each main scan line are different values. For example, some main scan lines are recorded by four nozzles while other main scan lines are recorded by two nozzles. Therefore, it is possible to increase the recording speed, comparing to cases when all main scan lines are recorded using four nozzles, and the image quality can be improved comparing to cases when all main scan lines are recorded using two nozzles.

In a preferred embodiment of the invention, the method comprises the step of: executing sub-scan with a constant sub-scan feed amount of L×P each time one main scan is completed, where P denotes a dot pitch corresponding to a printing resolution in the sub-scanning direction, and L is an integer of 1 or more, wherein a nozzle pitch of the plurality of nozzles in the sub-scanning direction is k×P where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets. This arrangement suppresses irregular colors of a low spatial frequency that can easily be recognized by the human eye, thereby improving image quality.

In another embodiment, the method comprises the step of: executing sub-scan with a variable sub-scan feed amount of L×P each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is k×P where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

The present invention can be realized in various forms such as a method and apparatus for printing, a method and apparatus for producing print data for a printing unit, and a computer program product implementing the above scheme.

These and other objects, features, aspects, and advantages of the present invention will become more apparent from the following detailed description of the preferred embodiments with the accompanying drawings.

BRIEF DESCRIPTION OF THE DRAWINGS

FIG. 5(A) shows an example of sub-scan feed on the basic conditions of a normal interlace recording method.

FIG. 5(B) shows the parameters of that dot recording on the basic conditions of a normal interlace recording method.

FIG. 6(A) shows an example of sub-scan feed on the basic conditions of an overlapping interlace recording method.

FIG. 6(B) shows the parameters of that dot recording on the basic conditions of an overlapping interlace recording method.

FIG. 10 is an explanatory diagram that shows the dot recording method of the first embodiment of the present invention.

FIG. 11(A) shows the allocation of raster data to each nozzle for the first comparative example of FIG. 9.

FIG. 11(B) shows the allocation of raster data to each nozzle for the first embodiment of FIG. 10.

FIG. 18 is an explanatory diagram that shows the dot recording method (relationship between the rasters and nozzles) of the sixth embodiment of the present invention.

FIG. 26 is an explanatory diagram that shows the dot recording method (pass 2 to pass 12) of the eleventh embodiment of the present invention.

FIG. 31(A) is an explanatory diagram that shows sub-scan feed for an interlace recording method.

FIGS. 31(B) and 31(C) show the numbers of the nozzles that record dots on each main scan line.

FIG. 32(A) is an explanatory diagram that shows sub-scan feed for an overlapping recording method.

FIGS. 32(B) and 32(C) show the numbers of the nozzles that record dots on each main scan line.

DESCRIPTION OF THE PREFERRED EMBODIMENT

The present invention is explained in the following sequence based on embodiments.

Figure 1:
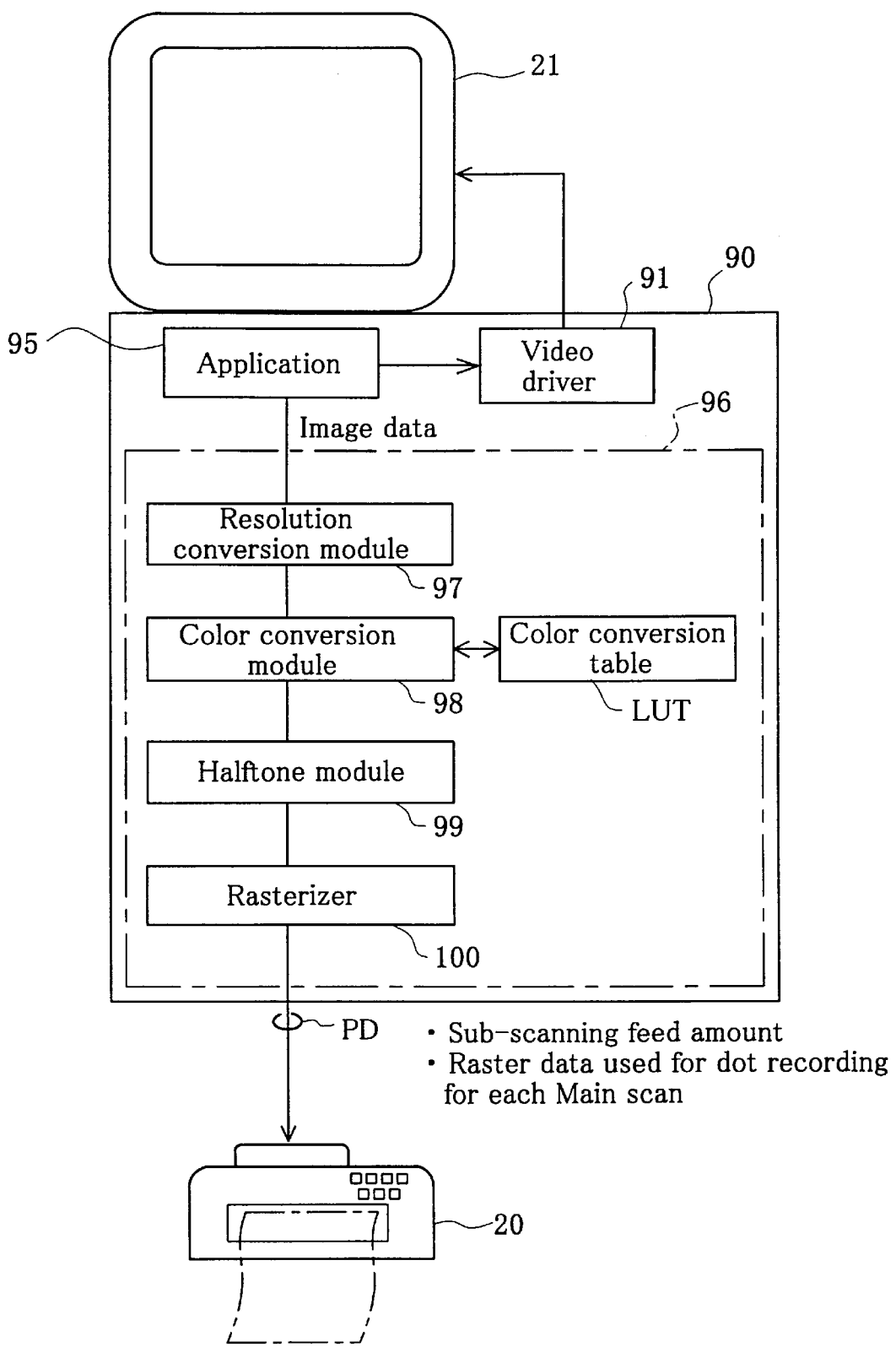
FIG. 1 is a block diagram that shows the structure of a printing system as a embodiment of the present invention.

A. Apparatus Structure:
B. Basic Conditions of the Recording Method:
C. Concept of Main scanning for Intermittent Overlapping Method
D. Constant Feed Dot Recording Method Comparative Example and Embodiments:
E. Variable Feed Dot Recording Method Comparative Example and Embodiments:
F. Embodiment of Dot Recording Method That Removes Low Frequency Color Irregularity:

A. Apparatus Structure:

FIG. 1 is a block diagram that shows the structure of a printing system as an embodiment of the present invention. This printing system has a computer 90 as a printing control apparatus, and a color printer 20 as a printing unit. The combination of color printer 20 and computer 90 can be called a "printing apparatus" in its broad definition.

Application program 95 operates on computer 90 under a specific operating system. Video driver 91 and printer driver 96 are incorporated in the operating system, and print data PD to be sent to color printer 20 is output via these drivers from application program 95. Application program 95 performs the desired processing on the image to be processed, and displays the image on CRT 21 with the aid of video driver 91.

When application program 95 issues a print command, printer driver 96 of computer 90 receives image data from application program 95, and converts this to print data PD to supply to color printer 20. In the example shown in FIG. 1, printer driver 96 includes resolution conversion module 97, color conversion module 98, Halftone module 99, rasterizer 100, and color conversion table LUT.

Resolution conversion module 97 has the role of converting the resolution (in other words, the pixel count per unit length) of the color image data handled by application program 95 to resolution that can be handled by printer driver 96. Image data that has undergone resolution conversion in this way is still image information made from the three colors RGB. Color conversion module 98 converts RGB image data to multi-tone data of multiple ink colors that can be used by color printer 20 for each pixel while referencing color conversion table LUT.

The color converted multi-tone data can have a tone value of 256 levels, for example. Halftone module 99 executes halftone processing to express this tone value on color printer 20 by distributing and forming ink dots. Image data that has undergone halftone processing is realigned in the data sequence in which it should be sent to color printer 20 by rasterizer 100, and ultimately is output as print data PD. Print data PD includes raster data that shows the dot recording state during each main scan and data that shows the sub-scan feed amount.

Printer driver 96 is a program for realizing a function that generates print data PD. A program for realizing the functions of printer driver 96 is supplied in a format recorded on a recording medium that can be read by a computer. As this kind of recording medium, any variety of computer readable medium can be used, including floppy disks, CD-ROMs, opt-magnetic disks, IC cards, ROM cartridges, punch cards, printed items on which a code such a bar code is printed, a computer internal memory device (memory such as RAM or ROM), or external memory device, etc.

Figure 2:
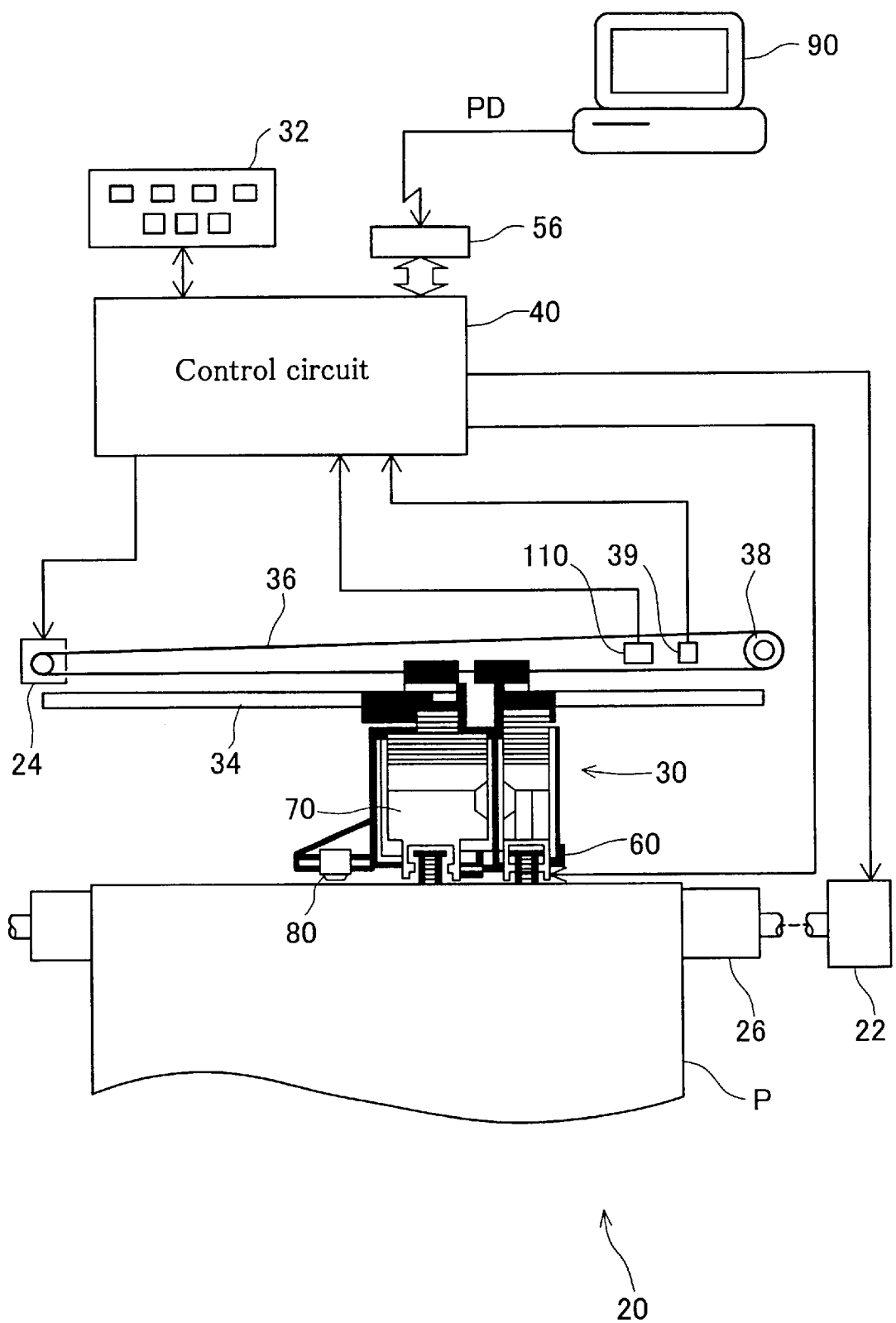
FIG. 2 is an explanatory diagram that shows the structure of the printer.

FIG. 2 is a schematic structural diagram of color printer 20. Color printer 20 is equipped with a sub-scan feed mechanism that carries printing paper P in the sub-scanning direction using paper feed motor 22, a main scan feed mechanism that sends cartridge 30 back and forth in the axial direction of platen 26 using carriage motor 24, a head driving mechanism that drives printing head unit 60 built into carriage 30 and controls ink ejecting and dot formation, and control circuit 40 that controls the interaction between the signals of paper feed motor 22, carriage motor 24, printing head unit 60, and operating panel 32. Control circuit 40 is connected to computer 90 via connector 56.

The sub-scan feed mechanism that carries printing paper P is equipped with a gear train (not illustrated) that transmits the rotation of paper feed motor 22 to paper carriage roller (not illustrated). Also, the main scan feed mechanism that sends carriage 30 back and forth is equipped with sliding axis 34 on which is supported carriage 30 so that it can slide on the axis and that is constructed in parallel with the axis of platen 26, pulley 38 on which is stretched seamless drive belt 36 between the pulley and carriage motor 24, and position sensor 39 that detects the starting position of carriage 30.

Figure 3:
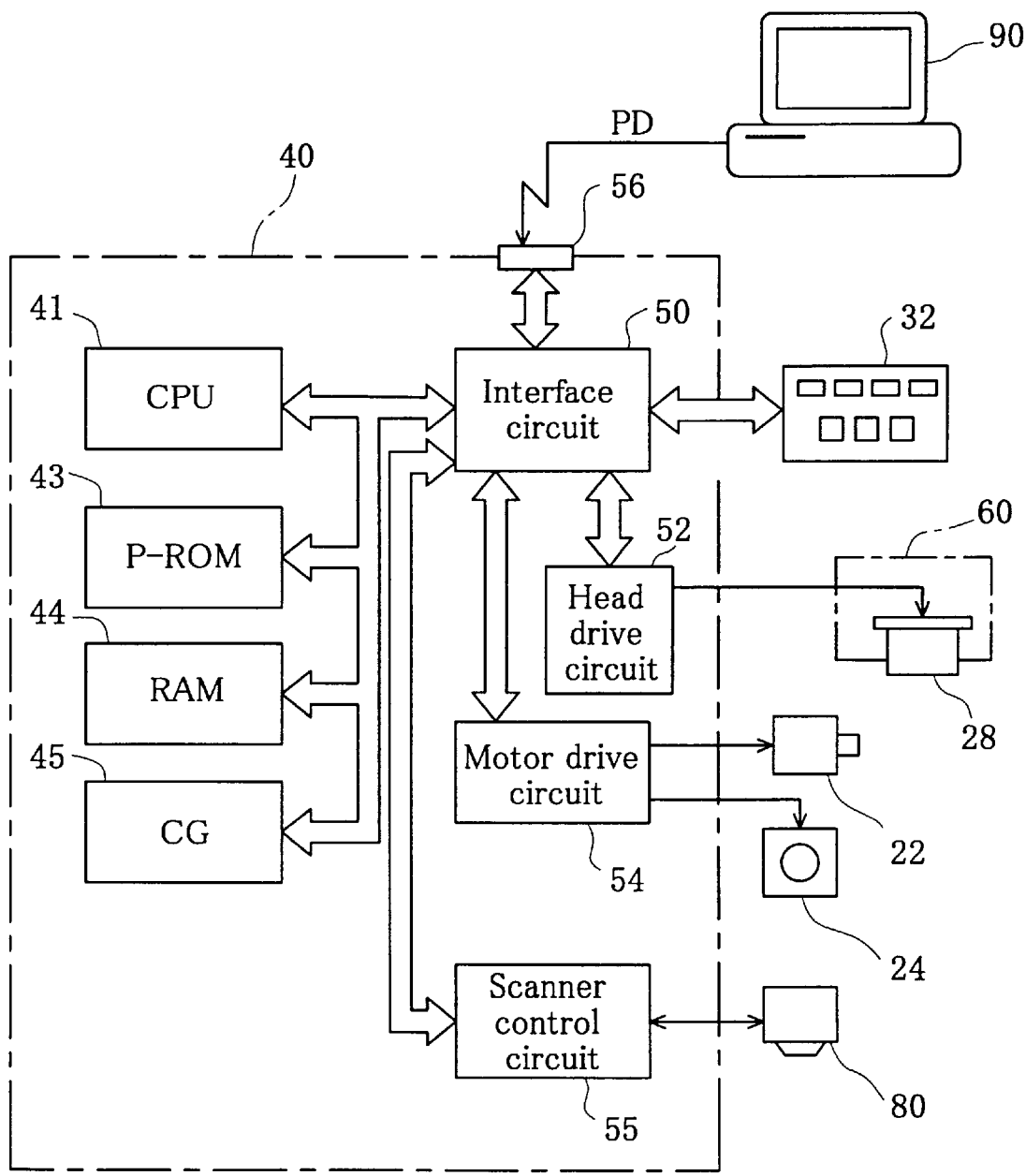
FIG. 3 is a block diagram that shows the structure of control circuit 40 in color printer 20.

FIG. 3 is a block diagram that shows the structure of color printer 20, the core of which is control circuit 40. Control circuit 40 is formed as an arithmetic and logic operating circuit that is equipped with CPU 41, programmable ROM (PROM) 43, RAM 44, and character generator (CG) 45 that stores the dot matrix of the characters. This control circuit 40 is further equipped with an interface circuit 50 that works exclusively as an interface with external motors, etc., head drive circuit 52 connected to this interface circuit 50 that drives printing head unit 60 and ejects ink, motor drive circuit 54 that drives paper feed motor 22 and carriage motor 24, and scanner control circuit 55 that controls scanner 80. Interface circuit 50 has a built in parallel interface circuit, and can receive print data PD supplied from computer 90 via connector 56. Color printer 20 executes printing according to this print data PD. RAM 44 functions as buffer memory for temporarily storing raster data.

Printing head unit 60 has printing head 28, and holds an ink cartridge. Printing head unit 60 can be attached and detached from color printer 20 as a part. In other words, printing head 28 is replaced together with printing head unit 60.

Figure 4:
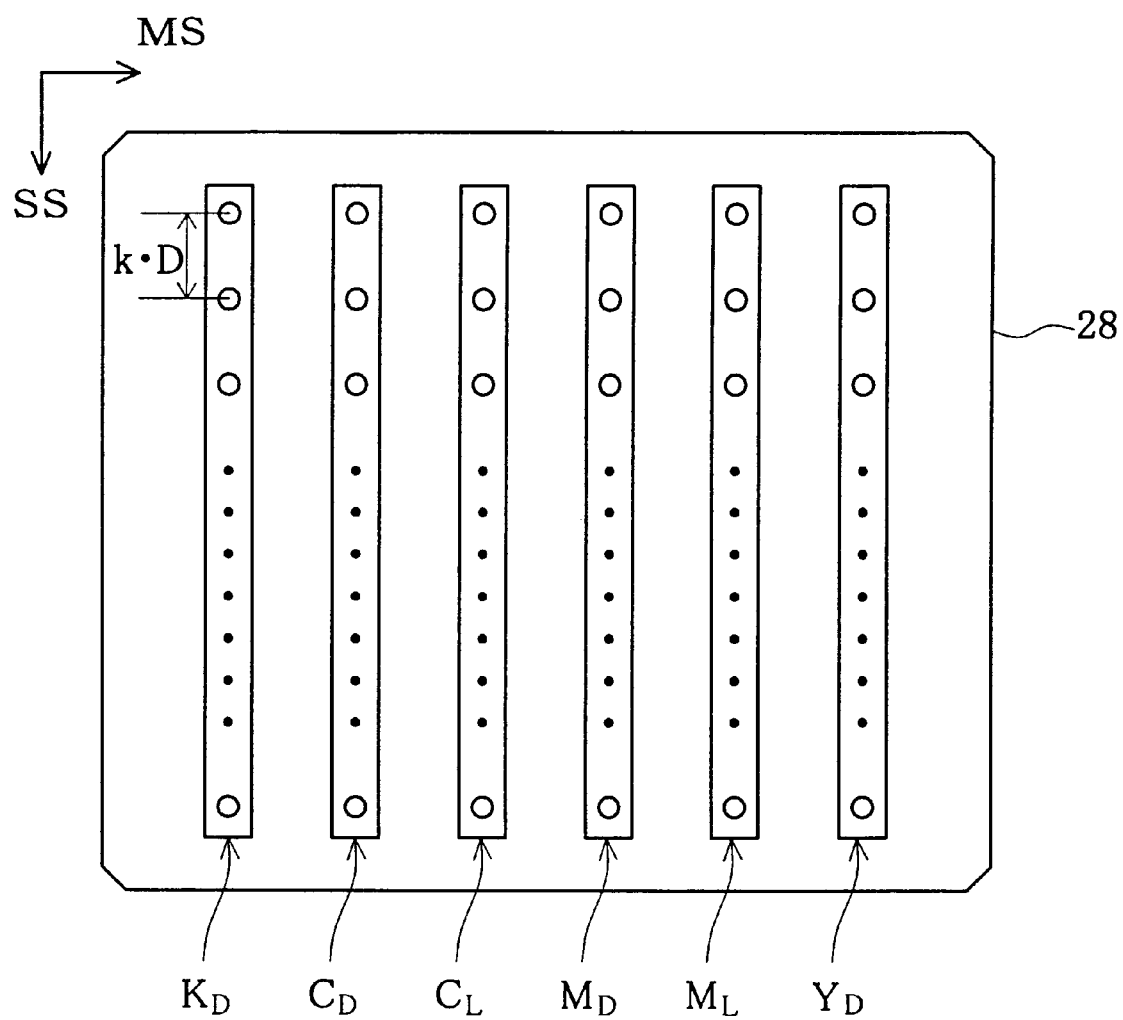
FIG. 4 is an explanatory diagram of the nozzle array on the bottom surface of printing head 28.

FIG. 4 is an explanatory diagram that shows the nozzle array on the bottom surface of printing head 28. Formed on the bottom surface of printing head 28 are black ink nozzle group KD for ejecting black ink, dark cyan ink nozzle group CD for ejecting dark cyan ink, light cyan ink nozzle group CL for ejecting light cyan ink, dark magenta ink nozzle group MD for ejecting dark magenta ink, light magenta ink nozzle group ML for ejecting light magenta ink, and yellow ink nozzle group YD for ejecting yellow ink.

The upper case alphabet letters at the beginning of the reference symbols indicating each nozzle group means the ink color, and the subscript "D" means that the ink has a relatively high density and the subscript "L" means that the ink has a relatively low density.

The multiple nozzles of each nozzle group are each aligned at a fixed nozzle pitch $k \cdot D$ along sub-scanning direction SS. Here, k is an integer, and D is the pitch (called "dot pitch") that correlates to the printing resolution in the sub-scanning direction. In this specification, we also say "the nozzle pitch is k dots." The "dot" unit means the print resolution dot pitch. Similarly, the "dot" unit is used for sub-scan feed amount as well.

Each nozzle is provided with a piezoelectric element (not illustrated) as a drive component that drives each nozzle to ejects ink drops. Ink drops are ejected from each nozzle while printing head 28 is moving in main scan direction MS.

Multiple nozzles of each nozzle group do not have to be arrayed in a straight line along the sub-scanning direction, but can also be arrayed in a zigzag, for example. Even when the nozzles are arrayed in a zigzag, the nozzle pitch k·D measured in the sub-scanning direction can be defined in the same way as the case shown in FIG. 4. In this specification, the phrase "multiple nozzles arrayed along the sub-scanning direction" has a broad meaning that includes nozzles arrayed in a zigzag.

Color printer 20 that has the hardware configuration described above, while carrying paper P using paper feed motor 22, sends carriage 30 back and forth using carriage motor 24, and at the same time drives the piezoelectric element of printing head 28, ejects ink drops of each color to form ink drops and forms a multi-tone image on paper P.

B. Basic Conditions of the Recording Method:

Before giving a detailed explanation of the recording method used in the embodiments of the present invention, first, the basic conditions of a normal interlace recording method is explained hereafter. An "interlace recording method" means a recording method that is used when the nozzle pitch k in the sub-scanning direction is two or greater. With an interlace recording method, with one main scan, a raster line that cannot be recorded is left between adjacent nozzles, and the pixels on this raster line are recorded during another main scan. In this specification, "printing method" and "recording method" are synonyms.

FIG. 5(A) shows an example of sub-scan feed of an ordinary interlace recording method, and FIG. 5(B) shows its parameters. In FIG. 5(A), the solid line circle around the numbers indicates positions of the four nozzles in the sub-scanning direction for each pass. The term "pass" means one main scan. The numbers 0 through 3 in the circles indicate the nozzle numbers. The positions of the four nozzles shift in the sub-scanning direction each time one main scan ends. However, in reality, the sub-scanning direction feed is realized by movement of the paper by paper feed motor 22 (FIG. 2).

As shown at the left side of FIG. 5(A), with this example, sub-scan feed amount L is a fixed value of four dots. Therefore, each time a sub-scan feed is done, the position of the four nozzles shifts by four dots each in the sub-scanning direction. Each nozzle has as a recording target all dot positions (also called "pixel positions") on each raster line during one main scan. In this specification, the total number of main scans performed on each raster line (also called "main scan lines") is called "scan repetition count s."

At the right side of FIG. 5(A) is shown the ordinal number of the nozzle that records dots on each raster line. With the raster lines drawn by a dotted line extending in the right direction (main scan direction) from the circles that indicate the sub-scanning direction position of the nozzles, at least one of the raster lines above or below this cannot be recorded, so in fact, dot recording is prohibited. Meanwhile, the raster lines drawn by a solid line extending in the main scan direction are in a range for which dots can be recorded on the raster lines before and after them. The range for which recording can actually be done will hereafter be called the valid recording range (or "valid printing range," "printing execution area," or "recording execution area").

In FIG. 5(B), various parameters relating to this dot recording method are shown. Dot recording method parameters include nozzle pitch k (dots), the number of working nozzles N, the scan repetition count s, the effective nozzle count Neff, and sub-scan feed amount L (dots).

In the example in FIGS. 5(A) and 5(B), nozzle pitch k is 3 dots. Number of working nozzles N is 4. Also, number of working nozzles N is the number of nozzles actually used among the multiple nozzles that are installed. Scan repetition count s means that main scans are executed s times on each raster line. For example, when scan repetition count s is 2, main scans are executed twice on each raster line. At this time, normally dots are formed intermittently at every other dot position on one main scan. In the case shown in FIGS. 5(A) and 5(B), the scan repetition count s is 1. The effective nozzle count Neff is a value of working nozzle number N divided by scan repetition count s. This effective nozzle count Neff can be thought of as showing the net number of the raster lines for which dot recording is completed with one main scan.

In the table in FIG. 5(B), the sub-scan feed amount L, its sum value $\Sigma L$, and nozzle offset F are shown for each pass. Here, offset F indicates how many dots the nozzle position is separated in the sub-scanning direction from the reference positions for each pass; the reference positions for which the offset is 0 are cyclical positions of the nozzles (in FIGS. 5(A) and 5(B), a position every three dots) at the first pass. For example, as shown in FIG. 5(A), after pass 1, the nozzle position moves in the sub-scanning direction by sub-scan feed amount L (4 dots). Meanwhile, nozzle pitch k is 3 dots. Therefore, the nozzle offset F for pass 2 is 1 (see FIG. 5(A)). Similarly, the nozzle position for pass 3 is moved from the initial position by $\Sigma L=8$ dots, and the offset F is 2. The nozzle position for pass 4 moves $\Sigma L=12$ dots from the initial position, and the offset F is 0. With pass 4 after three sub-scan feeds, nozzle offset F returns to 0, and by repeating a cycle of three sub-scans, it is possible to record dots on all raster lines in the valid recording range.

As can be understood from the example in FIGS. 5(A) and 5(B), when the nozzle position is in a position separated by an integral multiple of nozzle pitch k from the initial position, offset F is 0. In addition, offset F can be given by remainder $(\Sigma L) \% k$, which is obtained by dividing cumulative value $\Sigma L$ of sub-scan feed amount L by nozzle pitch k. Here, "%" is an operator that indicates that the division remainder is taken. If we think of the nozzle initial position as a cyclical position, we can also think of offset F as showing the phase shift amount from the initial position of the nozzle.

When the scan repetition count s is 1, to have no gaps or overlap in the raster line that is to be recorded in the valid recording range, the following conditions must be met.

Condition c1: The number of sub-scan feeds of one cycle is equal to nozzle pitch k.

Condition c2: Nozzle offset F after each sub-scan feed in one cycle assumes a different value in a range from 0 to (k−1).

Condition c3: The average sub-scan feed amount $(\Sigma L/k)$ is equal to the working nozzle number N. In other words, the cumulative value $\Sigma L$ of sub-scan feed amount L per cycle is equal to the working nozzle number N multiplied by nozzle pitch k, (N×k).

Each of the aforementioned conditions can be understood by thinking as follows. There are (k−1) raster lines between adjacent nozzles. In order for a nozzle to return to the reference position (position where offset F is 0) while performing recording on these (k−1) raster lines during one cycle, the number of sub-scan feeds in one cycle will be k. If the number of sub-scan feeds in one cycle is less than k, there will be gaps in the recorded raster lines, and if there are more than k sub-scan feeds in one cycle, there will be overlap in the recorded raster lines. Therefore, the aforementioned first condition c1 is established.

When the number of sub-scan feeds in one cycle is k, gaps and overlaps in the recorded raster lines are eliminated only when the values of offset F after each sub-scan feed are different from each other in the range 0 to (k−1). Therefore, the aforementioned second condition c2 is established.

If the aforementioned first and second conditions are established, during one cycle, recording of k raster lines will be performed for each of N nozzles. Therefore, with one cycle, recording of N×k raster lines is performed. Meanwhile, if the aforementioned third condition c3 is met, as shown in FIG. 5(A), the nozzle position after one cycle (after k sub-scan feeds) comes to a position separated by N×k raster lines from the initial nozzle position. Therefore, by fulfilling the aforementioned first through third conditions c1 to c3, it is possible to eliminate gaps and overlaps in the range of these N×k raster lines.

FIGS. 6(A) and 6(B) show the basic conditions of a dot recording method when the scan repetition count s is 2. Hereafter, we will call a dot recording method for which the scan repetition count s is 2 or greater an "overlapping method". FIG. 6(A) shows an example of sub-scan feed of the overlapping interlace recording method, and FIG. 6(B) shows its parameters. When the scan repetition count s is 2 or greater, main scanning is executed s times on the same raster line.

The dot recording method shown in FIGS. 6(A) and 6(B) has a different scan repetition count s and sub-scan feed amount L for the parameters of the dot recording method shown in FIG. 5(B). As can be seen from FIG. 6(A), the sub-scan feed amount L of the dot recording method in FIGS. 6(A) and 6(B) is a fixed value of 2 dots. In FIG. 6(A), the positions of nozzles at even numbered passes are shown by a diamond shape. Normally, as shown at the right side of FIG. 6(A), the recorded dot positions on even numbered passes are shifted by one dot in the main scan direction from those on the odd numbered passes. Therefore, multiple dots on the same raster line are intermittently recorded by two different nozzles. For example, the topmost raster line within the valid recording range is intermittently recorded every other dot by the #0 nozzle on pass 5 after intermittent recording is done every other dot by the #2 nozzle on pass 2. With this overlapping method, each nozzle is driven with intermittent timing so that (s−1) dot recording is prohibited after 1 dot is recorded during one main scan.

In this way, the overlapping method that has intermittent pixel positions on a raster line as a recording target during each main scan is called an "intermittent overlapping method." Also, instead of having intermittent pixel positions as the recording target, it is also possible to have all pixel positions on a raster line during each main scan be the recording target. In other words, when executing a main scan s times on one raster line, it is allowable to overstrike dots on the same pixel position. This kind of overlapping method is called an "overstrike overlapping method" or "complete overlapping method".

With an intermittent overlapping method, it is acceptable, as far as the target pixel positions of the multiple nozzles on the same raster line are shifted in relation to each other, so for the actual shift amount in the main scan direction during each main scan, a variety of shift amounts other than that shown in FIG. 6(A) are possible. For example, it is also possible to record dots in the positions shown by circles without shifting in the main scan direction on pass 2, and to record the dots in the positions shown by diamonds with the shift in the main scan direction performed on pass 5.

The value of offset F of each pass in one cycle is shown at the bottom of the table in FIG. 6(B). One cycle includes six passes, and offset F for pass 2 to pass 7 includes a value in the range of 0 to 2 twice each. Also, the change in offset F for three passes from pass 2 to pass 4 is equal to the change in offset F for three passes from pass 5 to pass 7. As shown at the left side of FIG. 6(A), the six passes of one cycle can be segmented into two small cycles of three passes each. At this time, one cycle ends by repeating a small cycle s times.

Generally, when scan repetition count s is an integer of 2 or greater, the first through third conditions c1 through c3 described above can be rewritten as the following conditions c1' through c3'.

Condition c1': The sub-scan feed count of one cycle is equal to the multiplied value of nozzle pitch k and scan repetition count s, (k×s).

Condition c2': Nozzle offset F after each of the sub-scan feeds in one cycle assumes a value in the range of 0 through (k−1), and each value is repeated s times.

Condition c3': The sub-scan average feed amount $\{\Sigma L/(k\times s)\}$ is equal to effective nozzle count Neff (=N/s). In other words, cumulative value $\Sigma L$ of sub-scan feed amount L per cycle is equal to the multiplied value of effective nozzle count Neff and the sub-scan feed count (k×s), $\{Neff\times(k\times s)\}$.

The aforementioned conditions c1' through c3' also holds when scan repetition count s is 1. Therefore, conditions c1' to c3' can be thought of as conditions that are generally established in interlace recording methods regardless of the value of scan repetition count s. In other words, if the aforementioned three conditions c1' through c3' are satisfied, it is possible to eliminate gaps and unnecessary overlaps for recorded dots in the valid recording range. However, when using the intermittent overlapping method, a condition is required whereby the recording positions of nozzles that record on the same raster line are shifted in relation to each other in the main scan direction. In addition, when using an overstrike overlapping method, it is enough to satisfy the aforementioned conditions c1' to c3', and for each pass, all pixel positions are subject to recording.

In FIGS. 5(A), 5(B), 6(A), and 6(B), cases when sub-scan feed amount L is a fixed value are explained, but the aforementioned conditions c1' to c3' can be applied not only in cases when sub-scan feed amount L is a fixed value, but also in cases of using a combination of multiple different values as the sub-scan feed amount. Note that in this specification, sub-scan feeds for which feed amount L is a fixed value are called "constant feeds," and sub-scan feeds that use combinations of multiple different values as the feed amount are called "variable feeds."

C. Concept of Main scanning for Intermittent Overlapping Method

Figure 7:
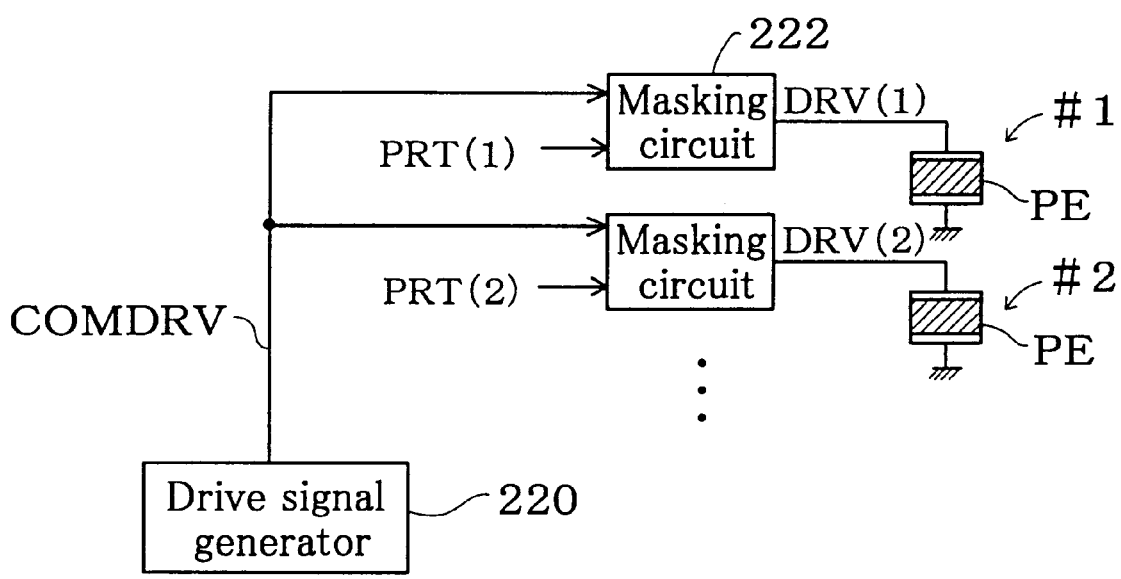
FIG. 7 is a block diagram that shows the major structure of head drive circuit 52.

FIG. 7 is a block diagram that shows the main configuration of head drive circuit 52 (FIG. 3). Head drive circuit 52 is equipped with drive signal generator 220, masking circuits 222, and piezoelectric element PE of each nozzle. Masking circuits 222 are provided for each nozzle #1, #2, ... of printing head 28. In addition, in FIG. 7, the number in parentheses added at the end of the signal names show the ordinal number of the nozzle to which that signal is supplied.

Figure 8A:
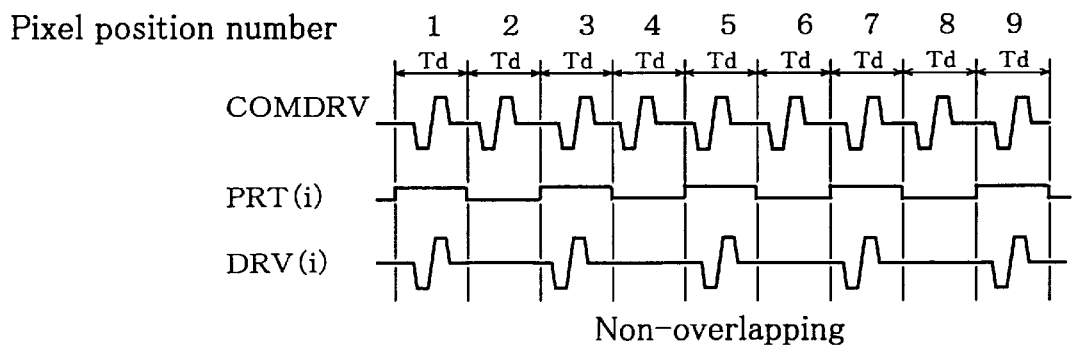
FIG. 8(A) is a timing chart that shows the operation of head drive circuit 52 for a on-overlapping interlace method.

FIG. 8(A) is a timing chart that shows the operation of head drive circuit 52 for a non-overlapping interlace method.

Drive signal generator 220 generates the original drive signal COMDRV used in common by each nozzle and supplies this to masking circuits 222. This original drive signal COMDRV is a signal that includes one pulse in one pixel period Td. The i-th masking circuit 222 masks original drive signal COMDRV according to the level of serial printing signal PRT (i) of the i-th nozzle. Specifically, masking circuits 222 pass original drive signal COMDRV as is when printing signal PRT (i) is level 1. To supply it to piezoelectric element PE as drive signal DRV. Meanwhile, when the printing signal PRT (i) is level 0, original drive signal COMDRV is blocked. This serial printing signal PRT (i) indicates the recording state of each pixel during one main scan by the i-th nozzle. This signal PRT(i) is derived from print data PD (FIG. 1) given from computer 90. FIG. 8(A) shows an example of when dots are recorded every other pixel. When dots are recorded for all pixels, original drive signal COMDRV is supplied as is to piezoelectric element PE as drive signal DRV.

Figure 8B:
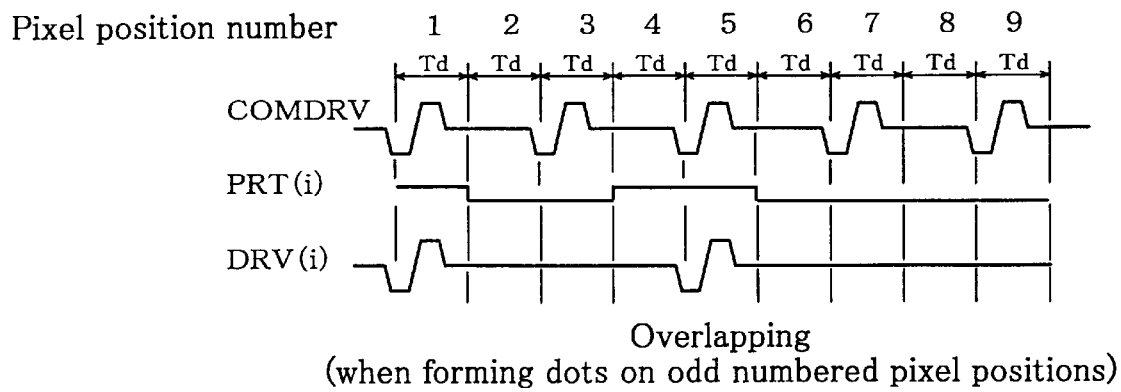
FIG. 8(B) is a timing chart when dots are formed at odd numbered pixel positions using an intermittent overlapping method.
Figure 8C:
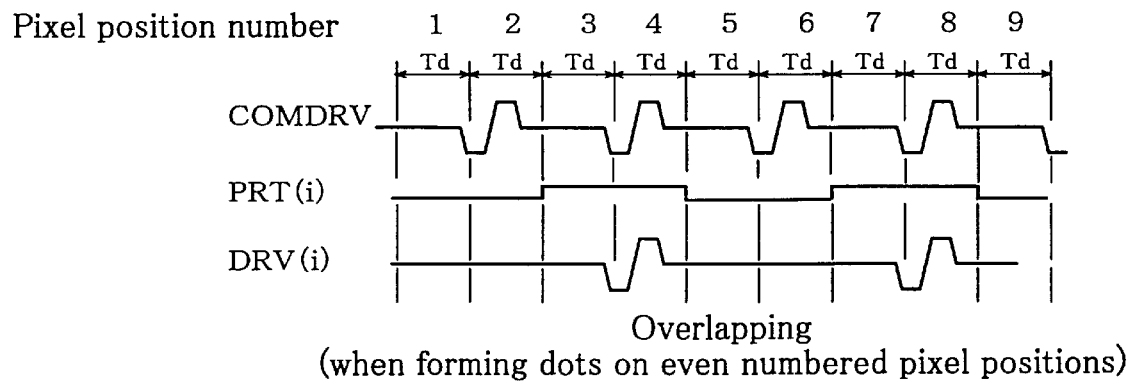
FIG. 8(C) is a timing chart when dots are formed at even numbered pixel position using an intermittent overlapping method.

FIG. 8(B) is a timing chart when dots are formed at odd numbered pixel positions using an intermittent overlapping method for which the scan repetition count s is 2, and FIG. 8(C) is a timing chart when dots are formed at even numbered pixel positions. With these examples, the waveform of the original drive signal COMDRV is generated at a rate of one pixel in two. Therefore, when the original drive signal waveform of FIG. 8(B) is used, even in a case when all serial printing signal PRT (i) are "1," dots can be formed only at the odd numbered pixel positions. Similarly, when the original drive signal waveform of FIG. 8(C) is used, even in a case when all serial printing signals PRT (i) are "1," dots can be formed only at the even numbered pixel positions. The reason that for the intermittent overlapping method the original drive signal COMDRV appears only in intermittent pixel positions in this way is to increase printing speed as explained hereafter.

Generally, with the condition of having the main scan speed being the same, printing speed is proportional to effective nozzle count Neff (in other words, the number of main scan lines for which dot formation is completed with one main scan). As described above, effective nozzle count Neff is a value of used nozzle count N divided by scan repetition count S. Therefore, with the condition that the main scan speed and used nozzle count are the same, printing speed is inversely proportional to scan repetition count s. For example, the overlapping method shown in Figure has a printing speed that is ½ that of the non-overlapping method shown in FIGS. 5(A) and 5(B).

In this way, when an overlapping method is used, the printing speed decreases. However, if the main scan speed is increased, it is possible to soften the degree of the printing speed reduction. For example, when scan repetition count s is 2, if the main scan speed is doubled, then the printing speed is the same as when scan repetition count s is 1. However, typically, the upper limit of the nozzle drive frequency (number of ink ejects per time unit) limits the main scan speed. In other words, to form dots at suitable pixel positions, it is also necessary to increase the nozzle drive frequency according to the increase in main scan speed. However, when the nozzle drive frequency is increased excessively, it is not possible to eject a suitable amount of ink. Therefore, to eject a suitable amount of ink at suitable pixel positions, there is an upper limit to the nozzle drive frequency, and thus there is a limit to the main scan speed as well.

In this way, the fact that there is an upper limit to the nozzle drive frequency limits the main scan speed. However, if ink ejecting is intermittent in the main scan direction, it is possible to make the main scan speed faster. For example, when ink is ejected intermittently in the main scan direction at a rate of one pixel in two, if the main scan speed is the same, the nozzle drive frequency will be sufficient at half. Generally, if ink is ejected at a rate of one pixel in q, even if the main scan speed is raised by q times, the nozzle drive frequency does not change, and ink can reach desired positions in the main scan direction.

Figure 9:
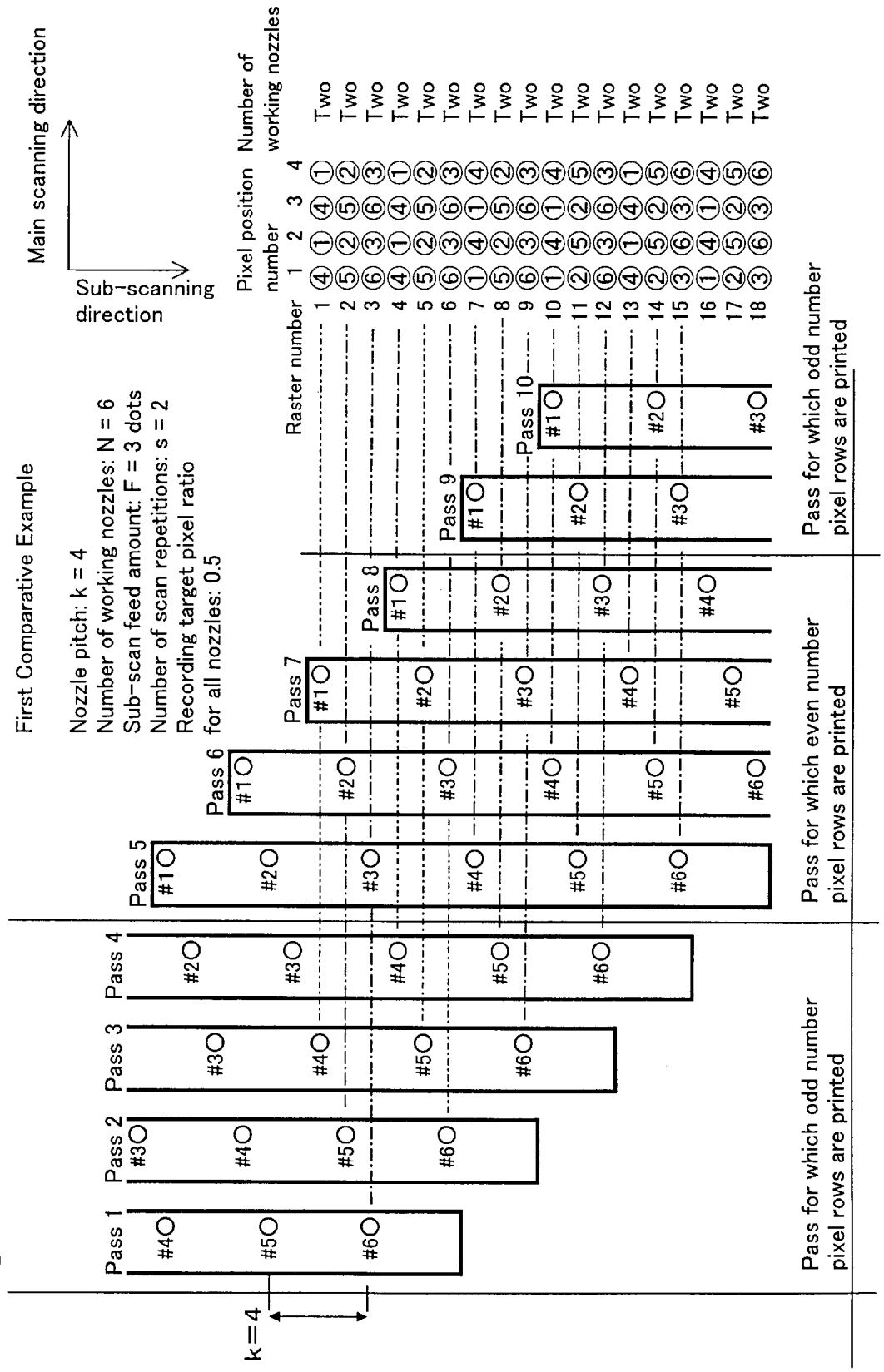
FIG. 9 is an explanatory diagram that shows the dot recording method of the first comparative example.

D. Constant Feed Dot Recording Method (Comparative Example and Embodiments):

FIG. 9 is an explanatory diagram that shows a first comparative example, which is a constant feed overlapping method. The parameters of this recording method are N=6, k=4, L=3, and s=2. These parameters fulfill conditions c1' through c3' described above. Therefore, it is possible to execute printing without gaps or unnecessary overlaps for the recorded dots.

The pixel position numbers shown at the right side of FIG. 9 show the sequence of the pixels on each raster line, and the numbers in circles indicate numbers of nozzles in charge of forming dots at those pixel positions. For example, the first raster line has dots formed alternately by the #1 and #4 nozzles. In other words, it shows that on the first raster line, the dot of pixel position #1 is formed by nozzle #4, and the dot of pixel position #2 is formed by nozzle #1. Similarly, the dots on the second raster line are formed by nozzles #2 and #5, and the dots on the third raster line are formed by nozzles #3 and #6. Then, generally, the (1+3×n)th raster line is formed by nozzles #1 and #4, the (2+3×n)th raster line is formed by nozzles #2 and #5, and the (3+3×n)th raster line is formed by nozzles #3 and #6. Meanwhile, when we look at passes, the (1+8×n)th, (2+8×n)th, (3+8×n)th, and (4+8×n)th passes form dots only at odd numbered pixel positions, and the (5+4×n), (6+4×n), (7+4×n), and (8+4×n) numbered passes form dots only at even numbered pixel positions.

For this first comparative example, the recording target pixel ratio for each nozzle is 0.5. Here, the "recording target pixel ratio" of a particular nozzle means the proportion of pixels for which dots are formed when that nozzle passes over one raster line. For this first comparative example, all of the working nozzles have the pixels on each raster line as targets of dot formation at a rate of one pixel in two. Therefore, the recording target pixel ratio for all nozzles is 0.5. In the embodiment described later, the recording target pixel ratio is different for each nozzle. However, typically, from that definition, the sum of the recording target pixel ratios relating to multiple nozzles in charge of forming dots on one raster line becomes 1.0.

In addition, the intermittence level q is 2 in this first embodiment. Here, intermittence level q means the value of the total number of pixels of one raster line divided by the number of pixels for which one nozzle can form dots on one pass. In the first comparative example, dots can only be formed in the even numbered rows or odd numbered rows for all of the passes. Therefore, dots can be formed at half the pixel positions of the raster lines on each pass, and the intermittence level q is 2. In addition, intermittence level q is closely related to the main scan speed. Specifically, if intermittence level q is increased, the dot formation frequency for a main scan decreases, so it is possible to reduce the nozzle drive frequency and thus to increase the main scan speed.

Figure 10:
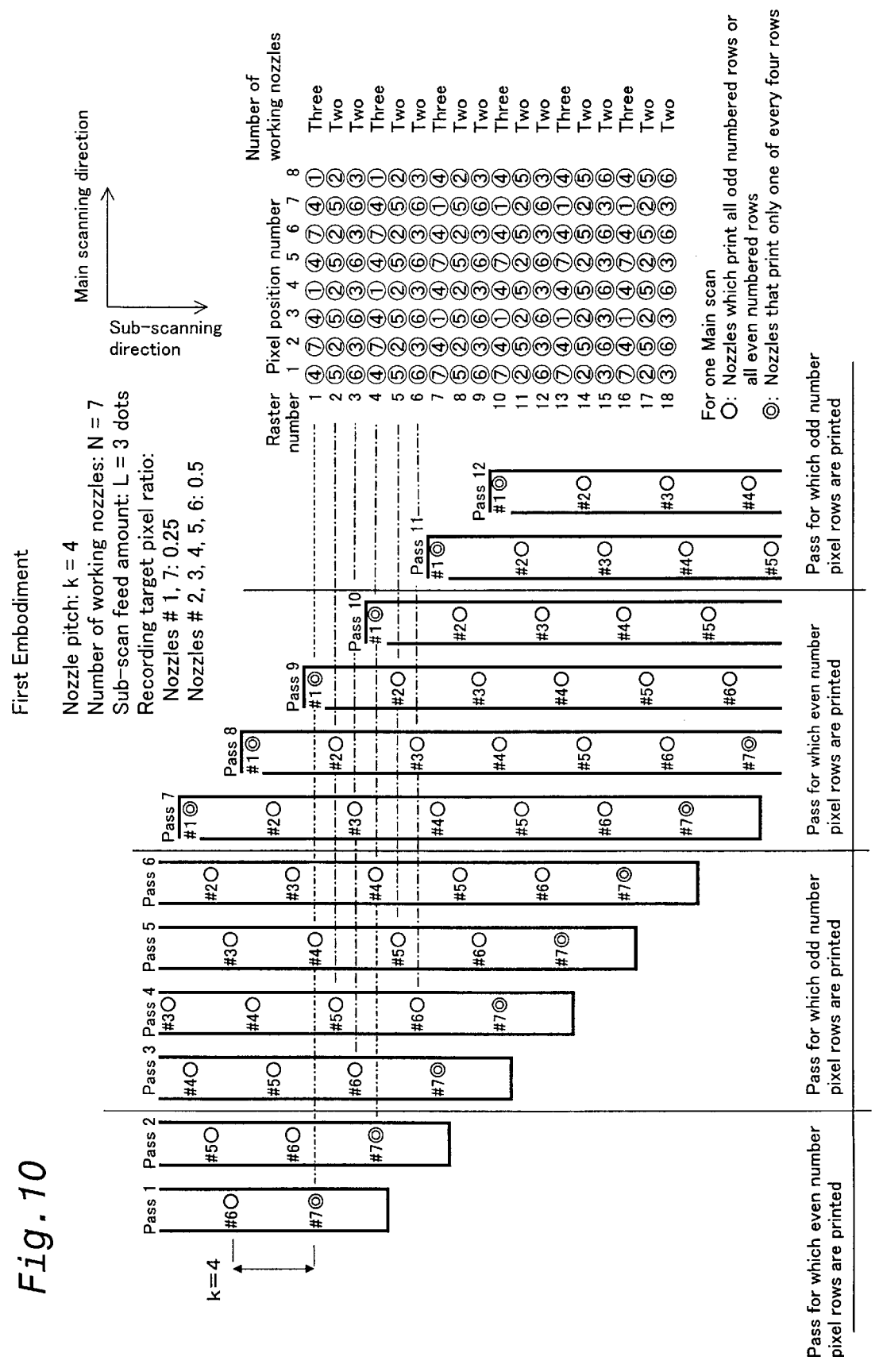

FIG. 10 is an explanatory diagram that shows the dot recording method of the first embodiment of the present invention. This dot recording method is different from the first comparative example shown in FIG. 9 in that nozzle #7 is added to the working nozzles. This nozzle #7 forms dots on (1+3×n)th raster line together with nozzles #1 and #4. In the first embodiment, two nozzles, #1 and #7, form dots on even numbered pixel position alternately while, in the first comparative example, nozzle #1 alone forms dots on the even numbered pixel positions. As to the odd numbered pixel positions, in both the first comparative example and the first embodiment, nozzle #4 forms the dots. Meanwhile, on the (2+3×n)th and (3+3×n)th raster lines, as with the first comparative example, in the first embodiment as well, dots are formed by two nozzles. With this specification, the raster lines recorded by multiple nozzles are called "overlapping raster lines." In the first embodiment, the (1+3×n)th raster line is recorded by three nozzles, but the (2+3×n)th and (3+3×n)th raster lines are recorded by two nozzles. In other words, the number of overlaps (number of working nozzles per raster line) differs for each raster line. This point is the difference between the first embodiment and the first comparative example.

As described above, in the first comparative example of FIG. 9, the recording target pixel ratio for each nozzle is 0.5. Meanwhile, for the first embodiment, the recording target pixel ratio for nozzle #4 is 0.5, but that for nozzles #1 and #7 is 0.25. In other words, nozzles #1 and #7 have pixel positions at a rate of one pixel in four as the recording target.

Generally, the sum of the recording target pixel ratios for multiple nozzles in charge of dot formation on each raster line is 1.0. For example, in the first comparative example in FIG. 9, the recording target pixel ratio for both of the two nozzles #1 and #4 in charge of recording dots on the first raster line is 0.5, and the sum of these is 1.0. Therefore, it is possible to complete a raster line without gaps in the pixel positions that are targets of recording. Meanwhile, in the first embodiment, dot formation is performed on the first raster line by nozzle #4 for which the recording target pixel ratio is 0.5 and by nozzles #1 and #7 for which the recording target pixel ratio is 0.25. In this case as well, the sum of the recording target pixel ratios is 1.0, and we can see that the raster line can be completed without any gaps.

FIG. 11(A) shows the allocation of raster data to each nozzle for the first comparative example of FIG. 9. The values of the raster data that shows the dot formation state on the first raster line are 1, 1, 1, 0, 0, 1 . . . Here, the value "1" shows that a dot is recorded at that pixel position, and the value "0" means that a dot is not recorded. With this first comparative example, for the first raster line, nozzle #1 is in charge of recording even numbered pixels, and nozzle #4 is in charge of recording odd numbered pixels. Also, there is no odd numbered pixel position data in the raster data allocated to nozzle #1, and only even numbered pixel position data is arrayed consecutively. As shown in FIG. 8(B) described above, this is because when dots are formed at odd numbered positions with an overlapping method, recording is not possible at even numbered pixel positions, so even numbered pixel position data is omitted in advance. Similarly, there is no even numbered pixel position data in the raster data allocated to nozzle #4, and only odd numbered pixel position data is arrayed consecutively. For the second raster line, nozzle #2 is in charge of recording even numbered pixels, and nozzle #5 is in charge of recording odd numbered pixels. Then, for the third raster line, nozzle #3 is in charge of recording even numbered pixels, and nozzle #6 is in charge of recording odd numbered pixels. Raster data allocated to each nozzle in this way correspond to serial printing signal PRT (i) shown in FIGS. 8(B) and 8(C).

FIG. 11(B) shows the allocation of raster data to each nozzle in the first embodiment of FIG. 10. For the second and third raster lines, the data is the same as for the first comparative example shown in FIG. 11(A), and the first raster line data is different from that of the first comparative example.

With the first embodiment, for the first raster line, the (4+4×n)th pixel position raster data is allocated to nozzle #1, the (2+4×n)th pixel position raster data is allocated to nozzle #7, and the odd numbered pixel position raster data is allocated to nozzle #4. Further, for the raster data allocated to nozzles #4 and #7, dummy data is allocated to the pixel positions for which those nozzles are not in charge of dot recording. Here, "dummy data" is data for which the value "0" is allocated regardless of the original raster data value. As a result, it is possible to have the target of dot recording be the even numbered pixel positions on the first raster line without gaps or overlap using two nozzles #1 and #7.

Control circuit 40 (FIG. 2) carries the printing medium in the main scan direction by L dots each time one main scan ends, and as a result, printing head 28 moves to the position of pass 2 from pass 1 in FIG. 10, for example. Nozzle #7 is positioned on the first raster line on pass 1, nozzle #4 on pass 5, and nozzle #1 on pass 9. In light of this, nozzles #7, #4, and #1 record designated pixels on these raster lines according to the raster data shown in FIG. 11(B). As a result, complementary recording operations are completed on the first raster line. By repeating the above operation, text and images are formed on the printing medium.

In the first embodiment in FIG. 10, three nozzles are in charge of dot formation on some raster lines. Therefore, it is possible to reduce banding (degradation of the image in a stripe shape extending in the main scan direction) compared to that of the first comparative example of FIG. 9. Also, raster lines for which dot recording is performed by three nozzles appear once each cycle for every three lines. In other words, there is variation in the number of nozzles that perform dot forming on one raster line, and this also has the effect of reducing banding.

From the meaning of having banding be less prominent, we can also consider increasing the number of nozzles in charge of dot recording for all raster lines. However, when the number of working nozzles for all the raster lines are increased uniformly, there is an excessive reduction in printing speed. In comparison to this, with the first embodiment described above, the number of working nozzles is mixed with different raster lines, so compared to the case of setting the number of working nozzles for all raster lines uniformly, there is the advantage of having it easier to attain a good balance between image quality and printing speed.

With bidirectional printing whereby main scanning is done in both directions, the above described dot recording also exhibits the effect described below. Specifically, as shown in FIG. 4, when a nozzle array of six colors of ink of $Y_D$, $M_D$, $M_L$, $C_D$, $C_L$, and $K_D$ are placed to record the same raster line, on the outgoing pass, each colored dot is formed on each raster line in the sequence $K_D$, $C_D$, $C_L$, $M_D$, $M_L$, and $Y_D$. Meanwhile, on the return pass, conversely, each colored dot is formed on each raster line in the sequence $Y_D$, $M_L$, $M_D$, $C_L$, $C_D$, and $K_D$. Therefore, it is possible to see a slight color difference between the raster line recorded on the outgoing pass and the raster line recorded on the return pass. At this time, when the conventional interlace recording method is used to record dots rather than using an overlapping method, the difference in colors between the raster line recorded on the outgoing pass and that recorded on the return pass may be quite noticeable. This is recognized as image degradation. Thus, as with the aforementioned embodiment, where an overlapping method is used, there is the advantage that the difference in colors of the raster lines with the outgoing pass and return pass is not so noticeable.

Figure 12:
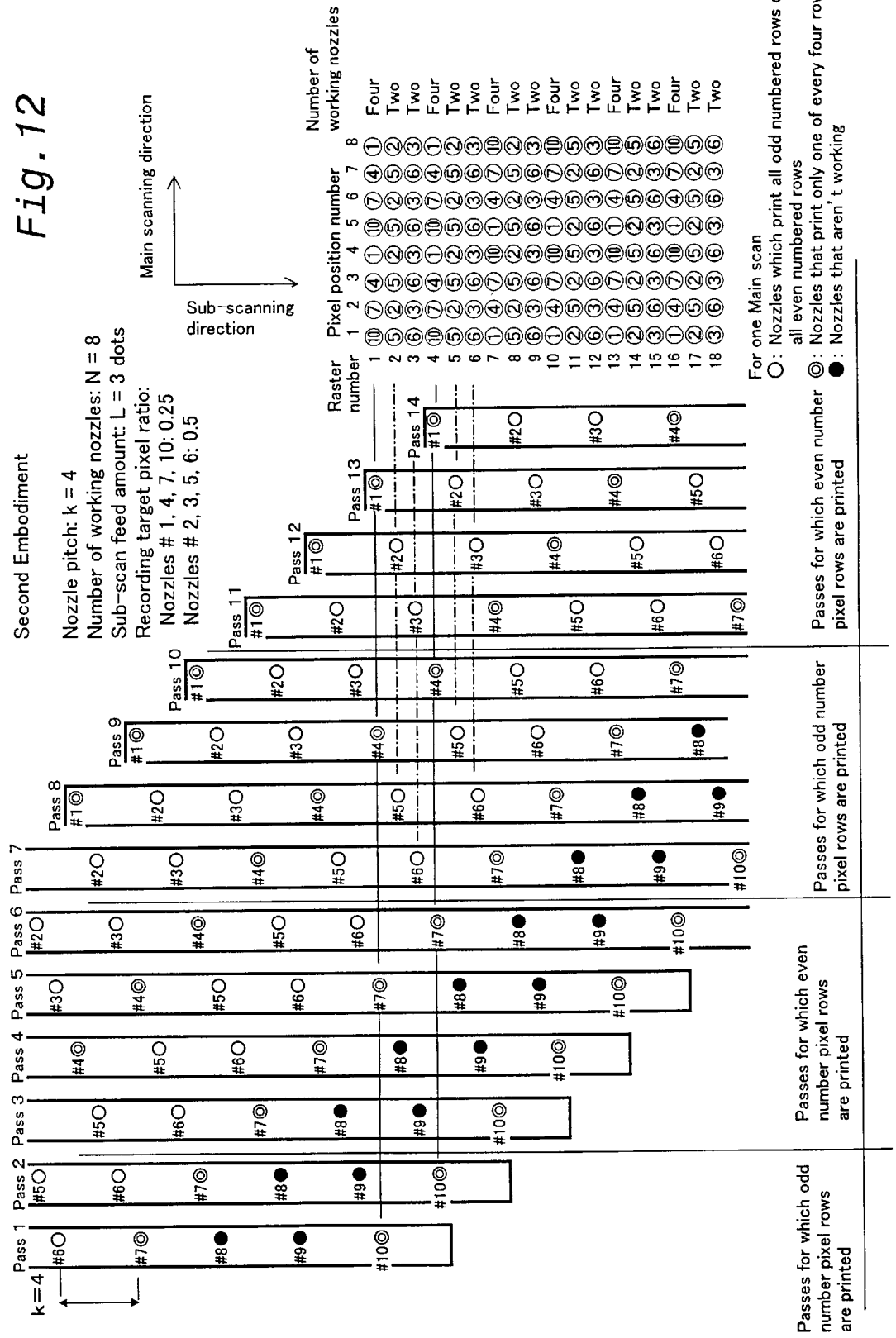
FIG. 12 is an explanatory diagram that shows the dot recording method of the second embodiment of the present invention.

FIG. 12 is an explanatory diagram that shows the recording method of the second embodiment of the present invention. The difference from the first comparative example shown in FIG. 10 is that nozzle #10 is further added to the working nozzles. However, nozzles #8 and #9 are not used. The (1+3×n)th raster line is recorded by the four nozzles #1, #4, #7, and #10. These nozzles #1, #4, #7, and #10 have pixel positions as recording targets at a rate of one pixel in four, so the recording target pixel ratio is 0.25. As with the first embodiment, the (2+3×n)th raster line and (3+3×n)th raster line are recorded by two nozzles each.

For the second embodiment, raster lines for which dots are recorded by two nozzles and raster lines for which dots are recorded by four nozzles are mixed. Therefore, compared with the first comparative example of FIG. 9 where all raster lines are recorded by two nozzles, it is possible to reduce the banding. Also, raster lines for which dot recording is performed by four nozzles appear once each cycle every three lines. In other words, there is variation in the number of nozzles that perform dot formation of on one raster line, and this also has the effect of reducing banding.

Figure 13:
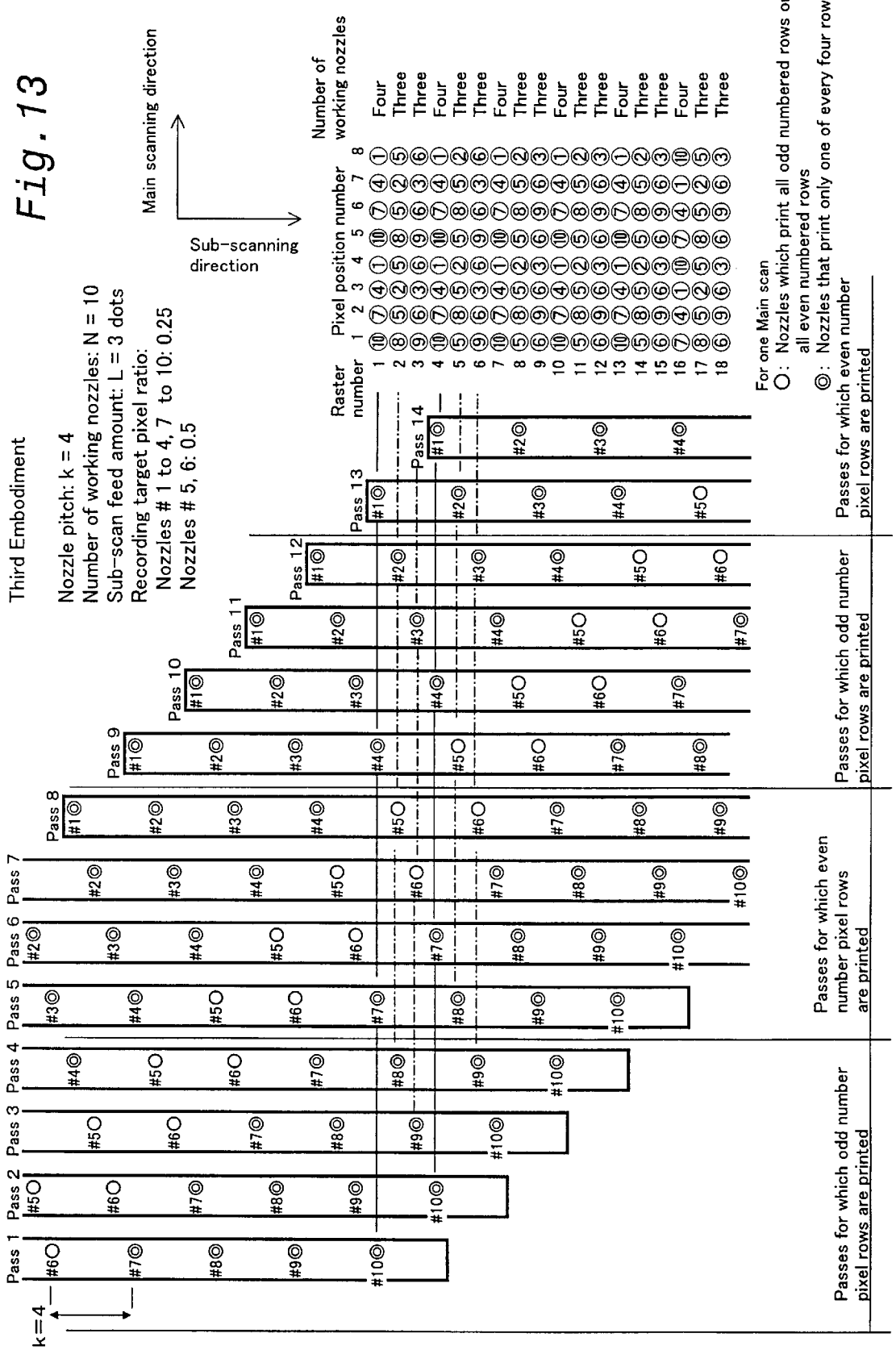
FIG. 13 is an explanatory diagram that shows the dot recording method of the third embodiment of the present invention.

FIG. 13 is an explanatory diagram that shows the recording method of the third embodiment of the present invention. The difference with the second embodiment shown in FIG. 12 is that two nozzles #8 and #9 are further added to the working nozzles. Dot formation on the first raster line recording is the same as that of the first embodiment, but that on the second and third raster lines is different. For the second raster line, nozzle #8 is in charge of dot recording for the (1+4×n)th pixel position, and nozzle #5 is in charge of even numbered pixel position dot recording, and nozzle #2 is in charge of dot recording for (3+4×n)th pixel positions. The recording target pixel ratio for nozzles #8 and #2 is 0.25, and the ratio for nozzle #5 is 0.5. Dot recording for the third raster line is completed by three nozzles #3, #6, and #9.

As can be seen from embodiments 1 through 3 described above, by suitably adding some suitable nozzles to the working nozzles in the first comparative example of FIG. 9 where uniform overlapping method is used with a scan repetition count s of 2, it is possible to increase the number of nozzles in charge of dot recording on several raster lines to 3 or 4. As a result, it is possible to reduce banding when compared to a uniform overlapping method. It is also possible to set the main scan speed and sub-scan feed amount of these embodiments to the same as those of the first comparative example, so the banding can be reduced without reducing the printing speed.

Figure 14:
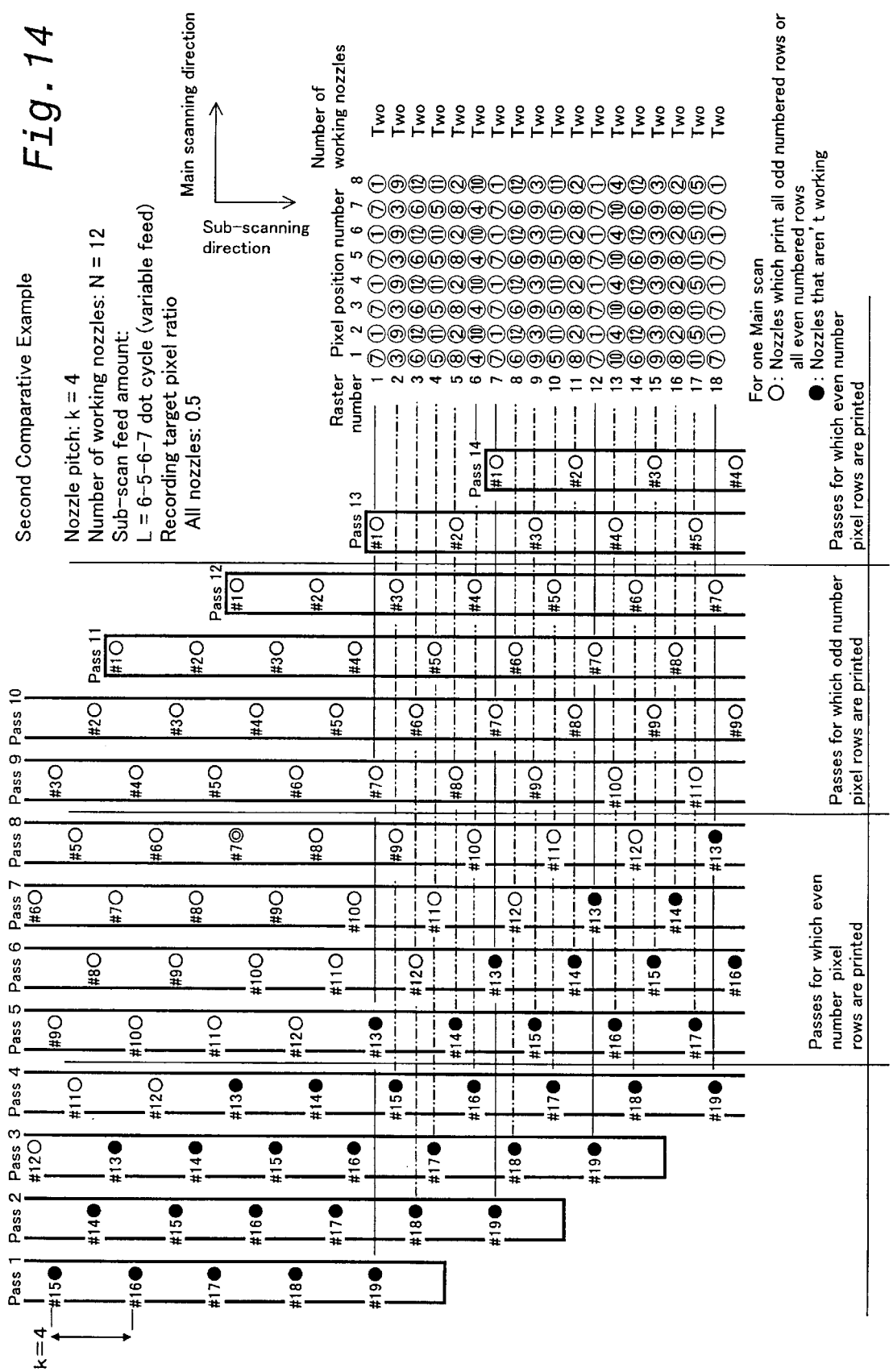
FIG. 14 is an explanatory diagram that shows the dot recording method of the second comparative example.

E. Variable Feed Dot Recording Method (Comparative Example and Embodiments):

FIG. 14 is an explanatory diagram that shows the second comparative example that is a variable feed uniform overlapping method. The parameters of this recording method are N=12, k=4, and s=2, and as sub-scan feed amount L, 6 dots, 5 dots, 6 dots, and 7 dots are repeatedly used. These parameters satisfy conditions c1' through c3' described above. Therefore, it is possible to execute printing without gaps or unnecessary overlap of the recorded dots. In addition, all raster lines are recorded by two nozzles.

For this second comparative example as well, as with the first comparative example (FIG. 9) described above, only even numbered pixel position raster data is allocated to nozzles that record even numbered pixel positions, and only odd numbered pixel position raster data is allocated to nozzles that record odd numbered pixel positions.

Figure 15:
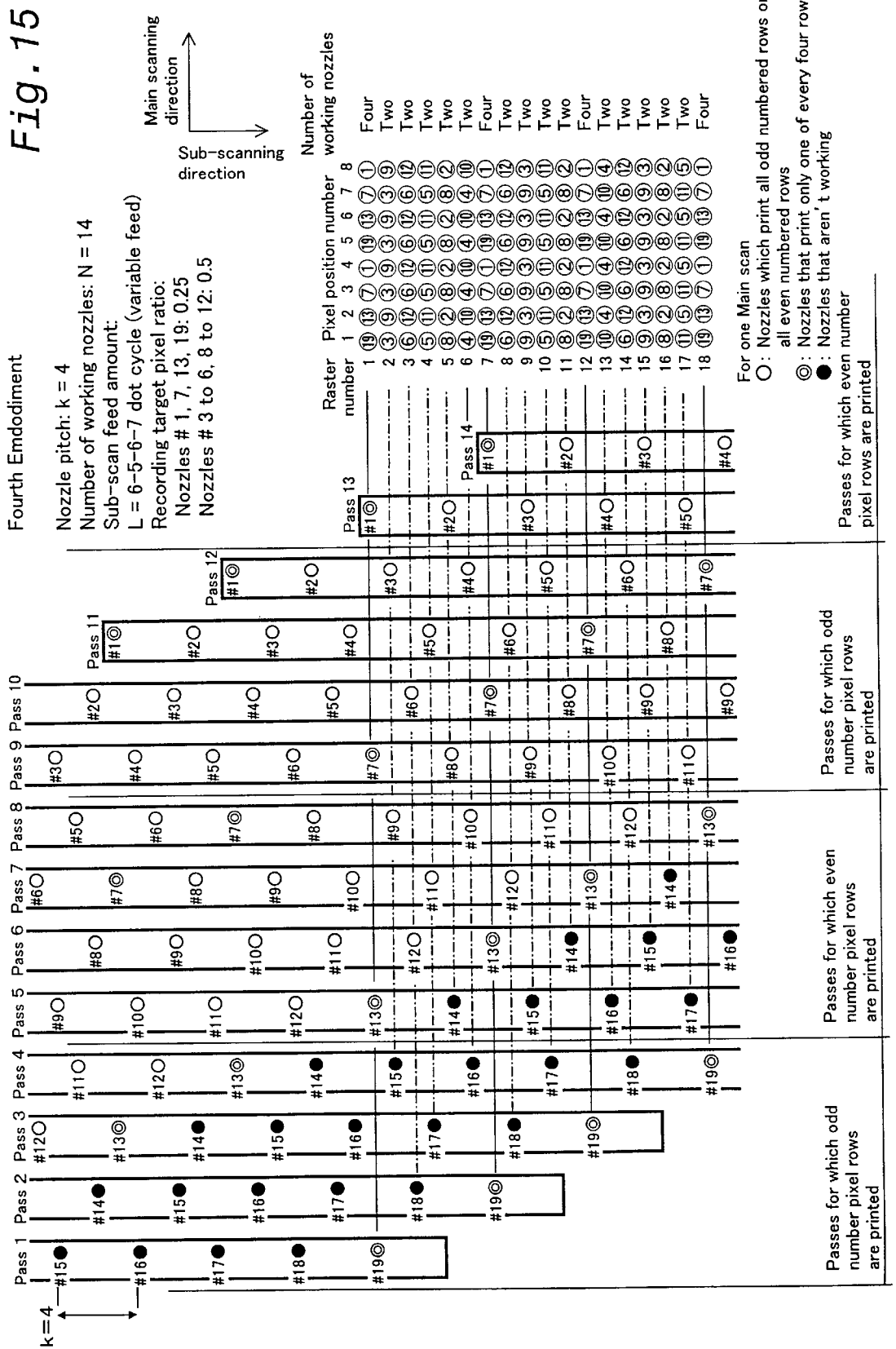
FIG. 15 is an explanatory diagram that shows the dot recording method of the fourth embodiment of the present invention.

FIG. 15 is an explanatory diagram that shows the recording method of a fourth embodiment of the present invention. For this fourth embodiment, nozzles #13 and #19 are added to the working nozzles for the second comparative example. Note that nozzles #14 through #18 are not used.

In the fourth embodiment, raster lines for which dots are recorded using two nozzles and raster lines for which dots are recorded using four nozzles are mixed together. Therefore, compared to case where all raster lines are recorded using two nozzles as in the second comparative example, it is possible to reduce banding. In addition, the raster lines for which dot recording is performed with four nozzles appear once every six lines.

In the fourth embodiment as well, the raster data to each nozzle is the same as in FIG. 11(B). Specifically, even numbered pixel position data is allocated to nozzles #1 and #13 which are in charge of recording even numbered pixel positions and for which the recording pixel ratio is 0.25, and dummy data is allocated to positions in the even numbered positions for which those nozzles are not in charge of recording. Similarly, odd numbered pixel position data is allocated to nozzles #7 and #19 which are in charge of recording odd numbered pixel positions and for which the recording pixel ratio is 0.25, and dummy data is allocated to positions in the odd numbered positions for which those nozzles are not in charge of recording.

Figure 16:
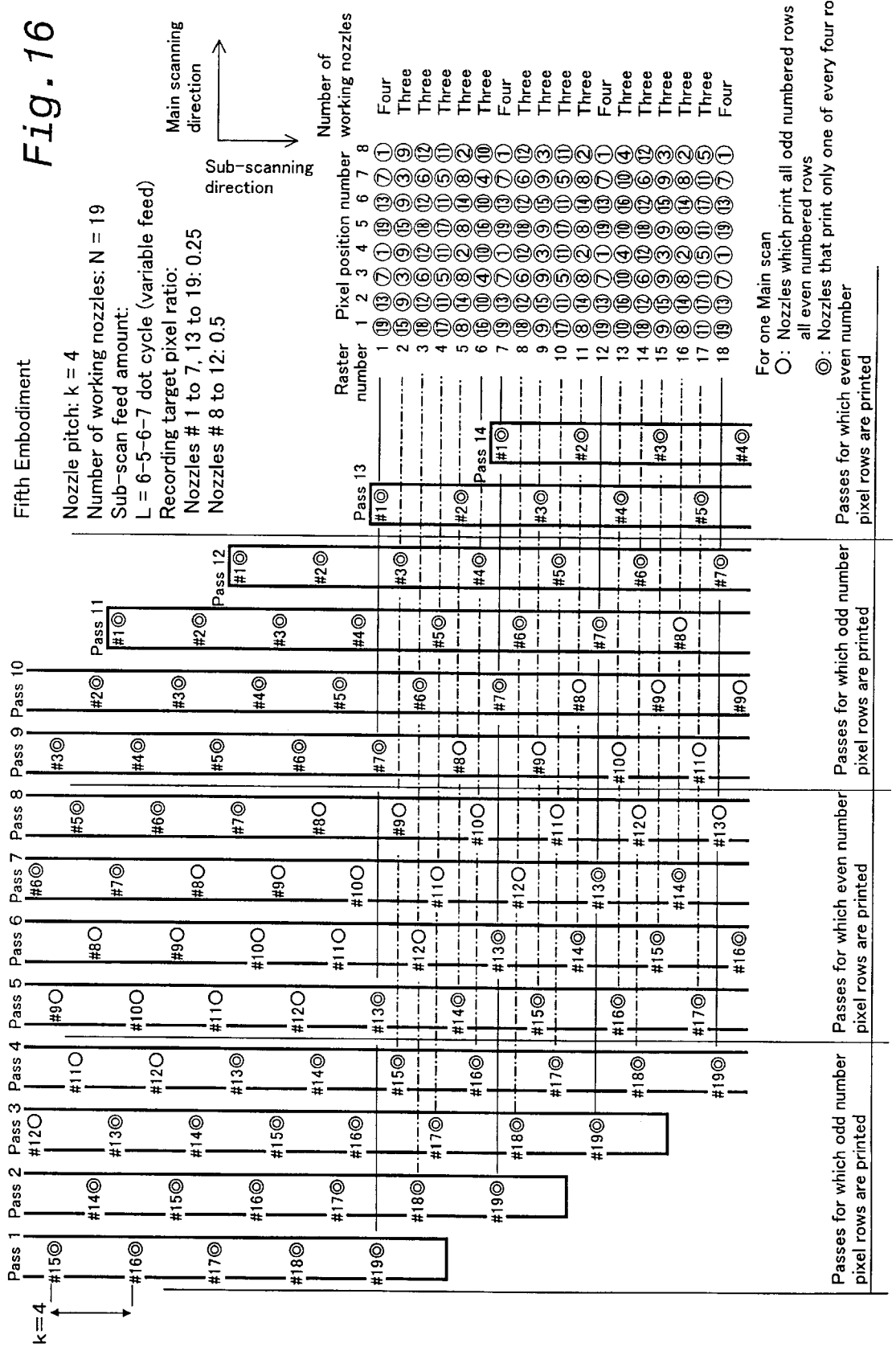
FIG. 16 is an explanatory diagram that shows the dot recording method of the fifth embodiment of the present invention.

FIG. 16 is an explanatory diagram that shows the recording method of a fifth embodiment of the present invention. The difference between this and the fourth embodiment shown in FIG. 15 is that nozzles #14 through 18 are added to the working nozzles. Consequently, the raster lines recorded by two nozzles in FIG. 14 are recorded by three nozzles in FIG. 15.

As can be seen from the fourth and fifth embodiments described above, even when variable feed is used, by adding some suitable nozzles to the working nozzles in a uniform overlapping method such as the second comparative example, it is possible to increase the number of nozzles in charge of dot recording on some raster lines to 3 or 4. As a result, it is possible to decrease the banding compared to that of a uniform overlapping method. Also, with these embodiments, for the main scan speed, it is possible to set the sub-scan feed amount to the same as for the second comparative example, so banding can be reduced without decreasing the printing speed.

Figure 17:
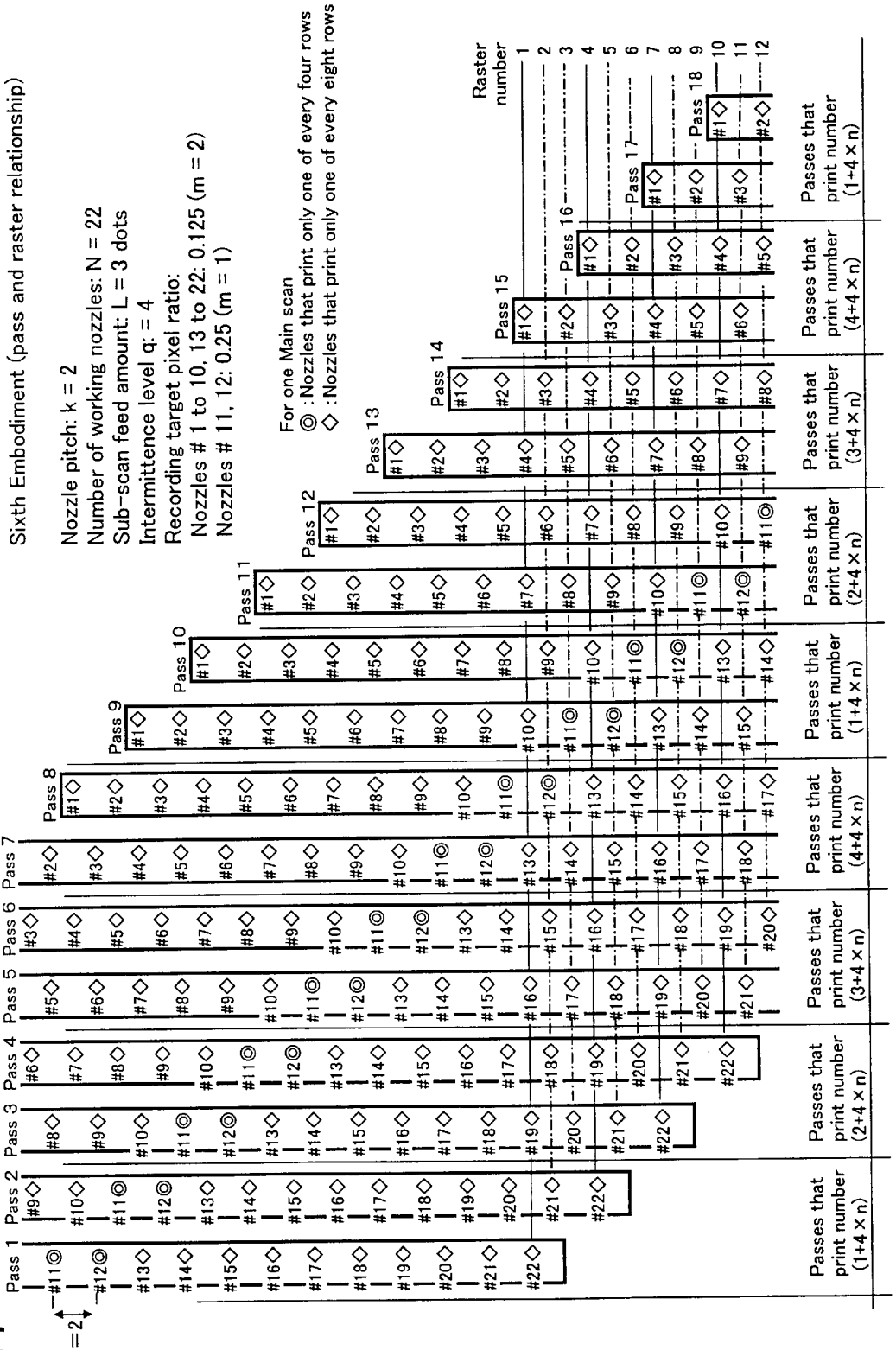
FIG. 17 is an explanatory diagram that shows the dot recording method (relationship between the passes and rasters) of the sixth embodiment of the present invention.

FIG. 17 is an explanatory diagram that shows the recording method of the sixth embodiment of the present invention, and FIG. 18 is an explanatory diagram that shows which nozzle records each pixel of each raster line for the sixth embodiment. The difference between this and the aforementioned first through fifth embodiments is that the value of intermittence level q is increased from 2 to 4, and that the number of working nozzles is also increased. As shown in FIG. 18, each raster line is recorded by 8 or 7 nozzles. With this sixth embodiment, by having the intermittence level q increased to 4, even if the main scan speed is increased to twice that of the aforementioned first through fifth embodiments, the nozzle drive frequency does not increase. Therefore, from the perspective of the upper limit of the nozzle drive frequency, it is possible to increase the main scan speed to twice that of the aforementioned first through fifth embodiments. The increase in the number of working nozzles also links to an increase in the number of working nozzles for recording one raster, making a further decrease in banding possible.

As can be seen from the above embodiments, for the present invention, generally, it is preferable to use an original drive signal waveform that allows formation of dots at a rate of one dot position in q on each raster line where q is a designated integer of 2 or greater. This is because by increasing the main scan speed, it is possible to compensate the decrease in printing speed that comes with an increase in the number of overlaps. At this time, the raster data allocated to each nozzle (FIGS. 11(A) and 11(B)) is configured so as to allow each nozzle to intermittently form dots at a rate of one dot position in q or at a rate of one dot position in m×q where m is an integer of 2 or greater on each raster line.

It is possible to think the aforementioned first through sixth embodiments as follows, from the point of the number of nozzles in charge of raster line recording. Specifically, with each of the aforementioned embodiments, the number of nozzles in charge of dot formation on some raster lines is set to a different value from the number of nozzles in charge of dot formation on the other raster lines. By doing this, it is possible to make fine adjustments in the balance between printing speed and banding reduction.

It is also possible to think the aforementioned first through sixth embodiments as follows, from the point of the recording target pixel ratio of each nozzle. Specifically, with each of the aforementioned embodiments, i-th nozzle in the working nozzles can form dots at selected pixel positions on one raster line during one pass, but is actually permitted to form dots at a rate of one in m(i) selected pixel positions. Further, the value of integer m(i) for at least two nozzles is different form those for the other nozzles. For example, in the sixth embodiment shown in FIGS. 17 and 18, m(i) is 2 for nozzles #1~#10,#13~#22, and 1 for nozzles #11,#12. By doing this, it is possible to make fine adjustments in the balance between printing speed and banding reduction.

Note that the above condition for the "number of nozzles in charge of raster line recording" and the condition for the "recording target pixel ratio of each nozzle" are not necessarily satisfied at the same time, and there are cases when only one is satisfied. For example, the recording target pixel ratio of each nozzle may not be fixed to a constant value for each nozzle, and may change for each main scan. Even in the case, the aforementioned condition for the "number of nozzles in charge of raster line recording" can be satisfied. The present invention is applicable to these various cases.

Figure 19:
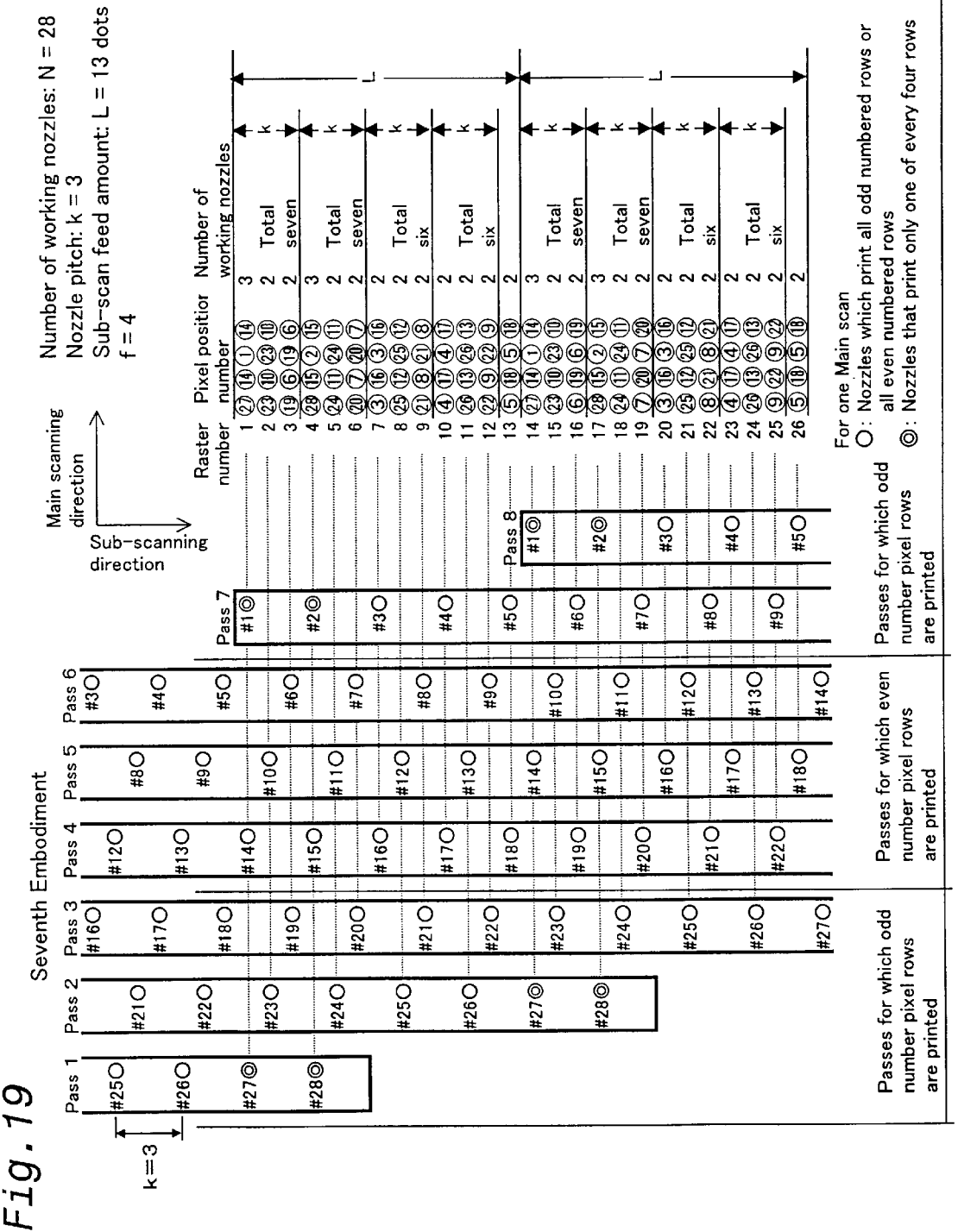
FIG. 19 is an explanatory diagram that shows the dot recording method of the seventh embodiment of the present invention.

F. Embodiment of Dot Recording Method That Removes Low Frequency Color Irregularity:

FIG. 19 is an explanatory diagram that shows a seventh embodiment of the present invention. This recording method is a non-uniform overlapping method with a constant feed as is the case with the first through third embodiments. However, the number of nozzles N and sub-scan feed amount L are bigger than the first through third embodiments.

When sub-scan feed amount L gets greater, a nozzle pattern cycle gets longer. Here, a "nozzle pattern" means the array of nozzle numbers that record one raster line. As can be seen from FIG. 19, with the constant feed, the nozzle pattern is repeated at the cycle of sub-scan feed amount L. For example, the nozzle pattern for raster line #1 is #27–#14–#1–#14. For the #14 raster line, which is separated by the sub-scan feed amount L (13 dots) from raster line #1, also has the same pattern. Similarly, raster line #2 has the same nozzle pattern as raster line #15, and raster line #3 has the same nozzle pattern as raster line #16. As explained below, if dots are deviated in the main scan direction, then image density variation and color shifts occur, and there is a tendency for this image density variation to become more noticeable as the sub-scan feed amount L becomes larger.

Figure 20:
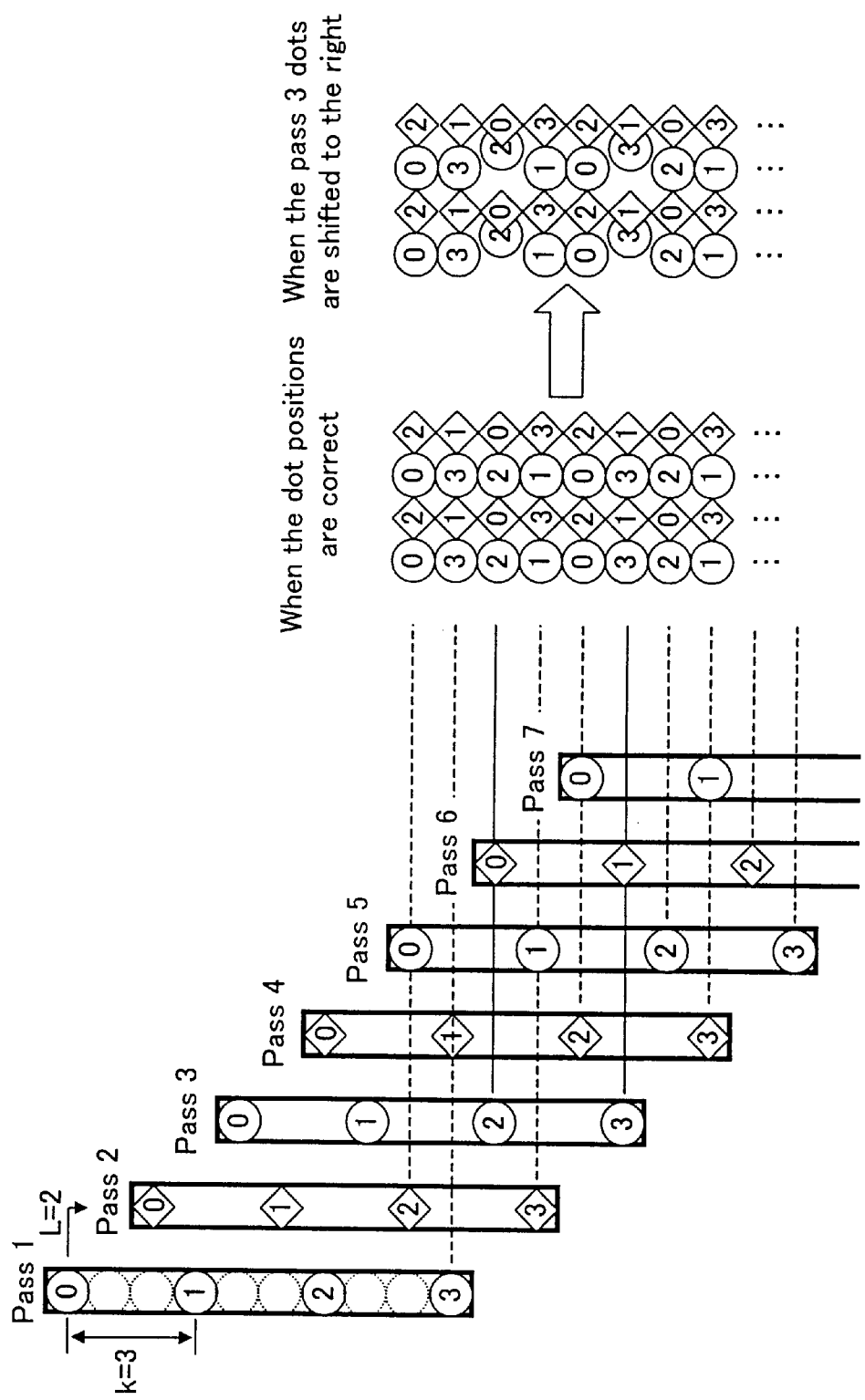
FIG. 20 is an explanatory diagram that shows a case when the dot position has shafted in the raster direction (main scanning direction).

FIG. 20 is an explanatory diagram that shows a case when the dot misalignment in the main scan direction. This kind of position shift occurs due to recording start position detection errors by the position sensor 39 (FIG. 2) and nozzle manufacturing errors. Generally, with rasters recorded by a single nozzle, adjacent recorded dots are placed overlapping correctly and regularly with each other in the raster direction. Meanwhile, with rasters recorded complementarily by multiple nozzles, gaps or overlaps occur between dots, causing image density variation. This image density irregularity also differs according to the nozzle pattern used for recording. Specifically, with the example shown in FIG. 20, the dots recorded on pass 3 are shifted to the right, so a gap occurs between the dots on the third and sixth raster lines, and the image density decreases.

Figure 21:
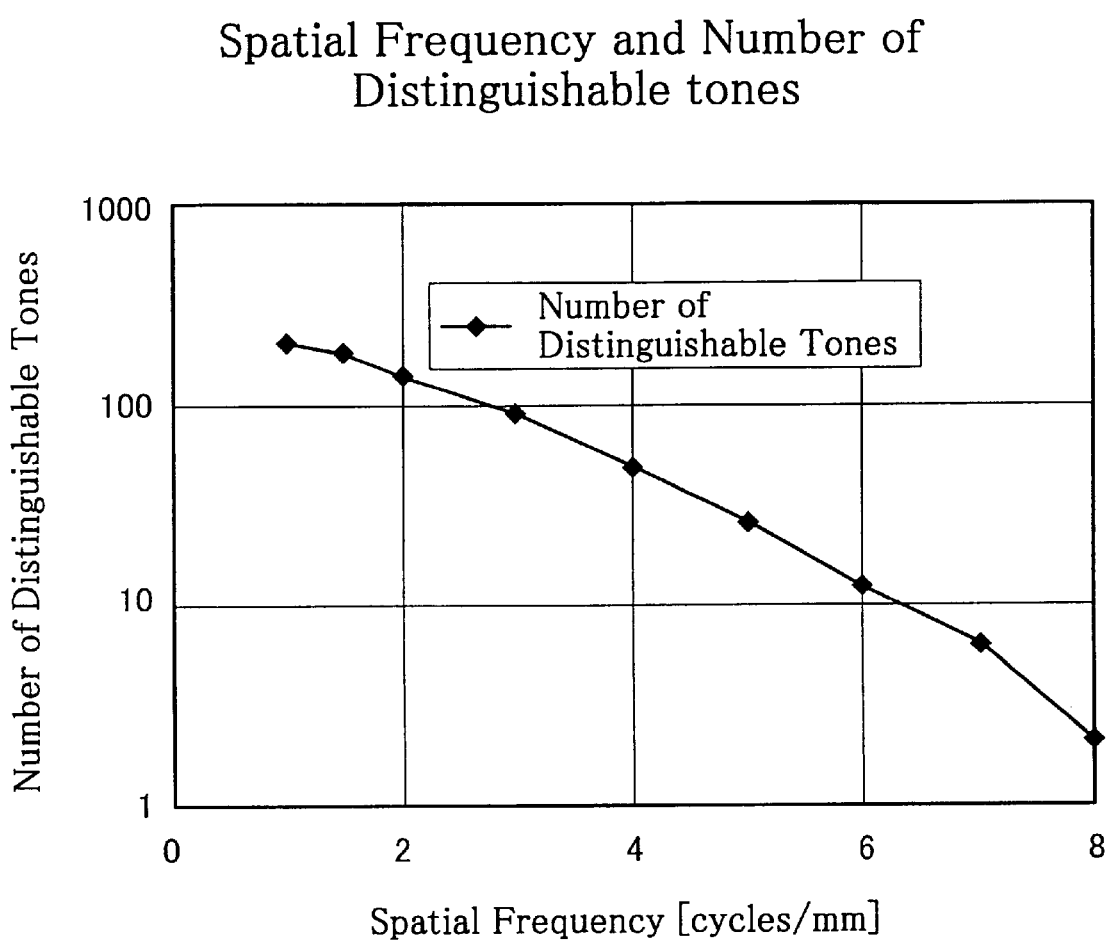
FIG. 21 is a graph that shows the relationship between the space frequency for human visual characteristics and the number of identifiable tones.

FIG. 21 is a graph that shows the relationship between the spatial frequency for human visual characteristics and the number of distinguishable tone. As shown in the Figure, as the spatial frequency gets larger recognition of the density difference becomes more difficult. For example, with the first embodiment describe above, sub-scan feed amount L is 3 dots. Therefore, if we assume the raster line density is 720 dpi, for example, then the spatial frequency of sub-scan feed amount L is 9.4 cycles/mm (720 dpi÷(25.4 in×3 dots)). In this case, as shown in FIG. 21, because there are very few tones that can be distinguished, even if there is color irregularity for each sub-scan feed amount L, it would be difficult for the human eye to recognize this.

However, as sub-scan feed amount L gets larger, the number of distinguishable tones rapidly increases, and color irregularity becomes noticeable. For example, with the seventh embodiment, the spatial frequency of the color irregularity that occurs for each sub-scan feed amount L is 2.2 cycles/mm (720 dpi÷(25.4 in×13 dots)). Therefore, in the seventh embodiment the color irregularity is more noticeable than in the first embodiment.

Figure 22:
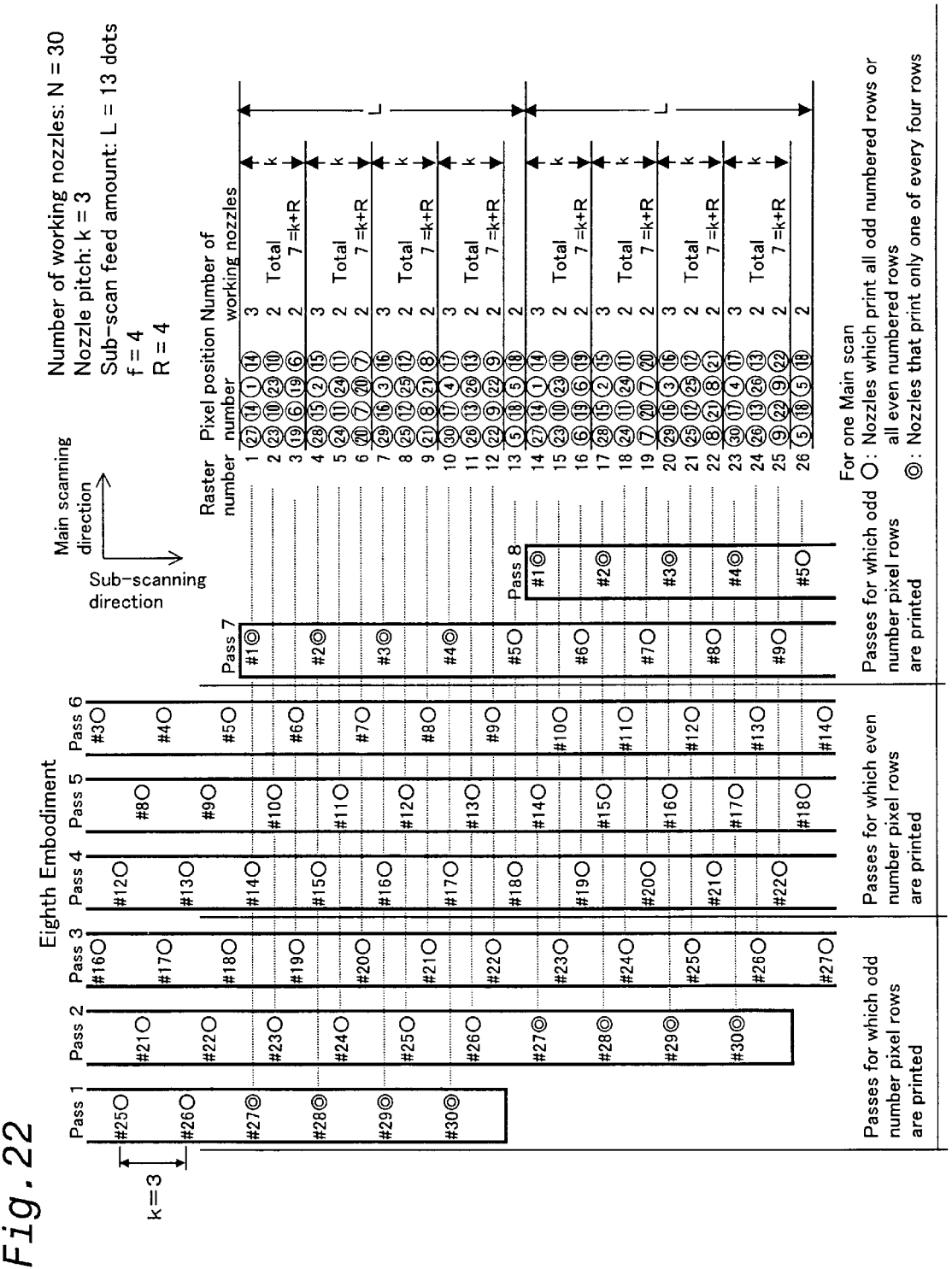
FIG. 22 is an explanatory diagram that shows the dot recording method of the eighth embodiment of the present invention.

FIG. 22 is an explanatory diagram that shows the dot recording method of an eighth embodiment of the present invention. This eighth embodiment differs from the seventh embodiment in that the nozzle count N of one color satisfies the following equations.

$$L = f \times k \pm g \tag{1}$$

$$N = L + Rd[R \times L \div k] \tag{2}$$

Here, L is sub-scan feed amount, f is an integer of 2 or greater, g is an integer of 1 or greater and less than k, and R is an integer that is greater than k and not a integral multiple of k. In addition, Rd [ ] is an operator that is rounded down or rounded up. The reason why R is not an integral multiple of k is that when R is an integral multiple of k, the method is of uniform overlapping. With the eighth embodiment, k=3, f=4, L=13, and R=4. In addition, "+1" is selected as the value of the term "±g" of equation 1.

The significance of equation (1) can be thought of as follows. When the second term "±g" of equation (1) is ignored, the first term "f×k" makes the sub-scan feed amount L. In this case, L consecutive raster lines are divided into f sets of raster line groups each including k lines. For example, with the eighth embodiment shown in FIG. 22, 13 raster lines are divided into four raster line groups of 3 lines each. However, with this eighth embodiment, the second term "±g" is "+1," so the 13 raster lines consists of four sets of raster line groups of 3 lines each and one raster line. Also, if the second term "±g" is set to 0, then L=f×k, so the conditions (for example the aforementioned condition c2) that should be satisfied by a constant feed recording method are not satisfied. Specifically, the second term "±g" of equation (1) is for satisfying a constant feed recording method. Also, when "±1" is used as the second term of equation (1), there is the advantage that it is possible to establish a constant feed recording method for any value as long is k is 2 or greater.

The significance of equation (2) can be thought of as follows. The first term "L" at the right side of equation (2) shows the minimum nozzle count for recording without overlapping. The second term Rd [R×L÷k] of equation (2) shows the number of working nozzles for overlapping. The L÷k here is a number that shows how many raster line groups are included in the range of one sub-scan feed amount. Meanwhile, R is an integer, so "R×L÷k" is a value that shows a integral multiple of the number of raster line groups included in the range of one sub-scan feed amount. If the rounding operator Rd [ ] of the second term is ignored, we can see that the second term is intended to change nozzle count N by an integral multiple of the number of raster line groups (L/k) included in the range of one sub-scan feed amount.

When R is 0, all raster lines are recorded without overlapping (in other words by one nozzle). Each raster line group includes k raster lines, so with this non-overlapping recording, each raster line group is recorded by a total of k nozzles. Meanwhile, when R is 1 or greater, (R×L/k) nozzles are added for overlapping, but these (R×L/k) added nozzles can be thought of as being approximately evenly allocated to each (L/k) raster line group. When this is done, R each added nozzles are allocated to each raster line group. Therefore, when R is 1 or greater, each raster line group is recorded by a total of (k+R) nozzles. With the example in FIG. 22, k=3 and R=4, so each raster line group is recorded by a total of 7 nozzles. As can be seen from this example, the aforementioned equation (2) has the effect of evening the nozzle count used for recording each raster line group.

In this eighth embodiment, the reason that low frequency color irregularity is removed is as follows. As can be seen from the explanation above, each raster line group is equally recorded by 7 nozzles. Also, the number of working nozzles to record each raster line in each raster line group is fixed at 3, 2, and 2. Also, hereafter, the number of working nozzles to record each raster line is called the "raster line recording nozzle count." It is known that color irregularity is also dependent on the raster line recording nozzle count. With the eighth embodiment, the raster line recording nozzle count in the raster line group is set at 3, 2, and 2, so we can think of color irregularity as also occurring at a small cycle of k lines corresponding to the raster line group. As a result, the long cycle color irregularity that is easily visually recognized by humans is eliminated.

Meanwhile, with the seventh embodiment shown in FIG. 19, the parameters are the same as the eighth embodiment except for the nozzle count, but there is the difference that nozzle count N is two less. As a result, as is clear from FIG. 19, the total nozzle count used by raster line groups is 7, 7, 6, and 6, and this is not fixed. As a result, there is a chance that color irregularity will occur at the long cycle of sub-scan feed amount L.

Figure 23:
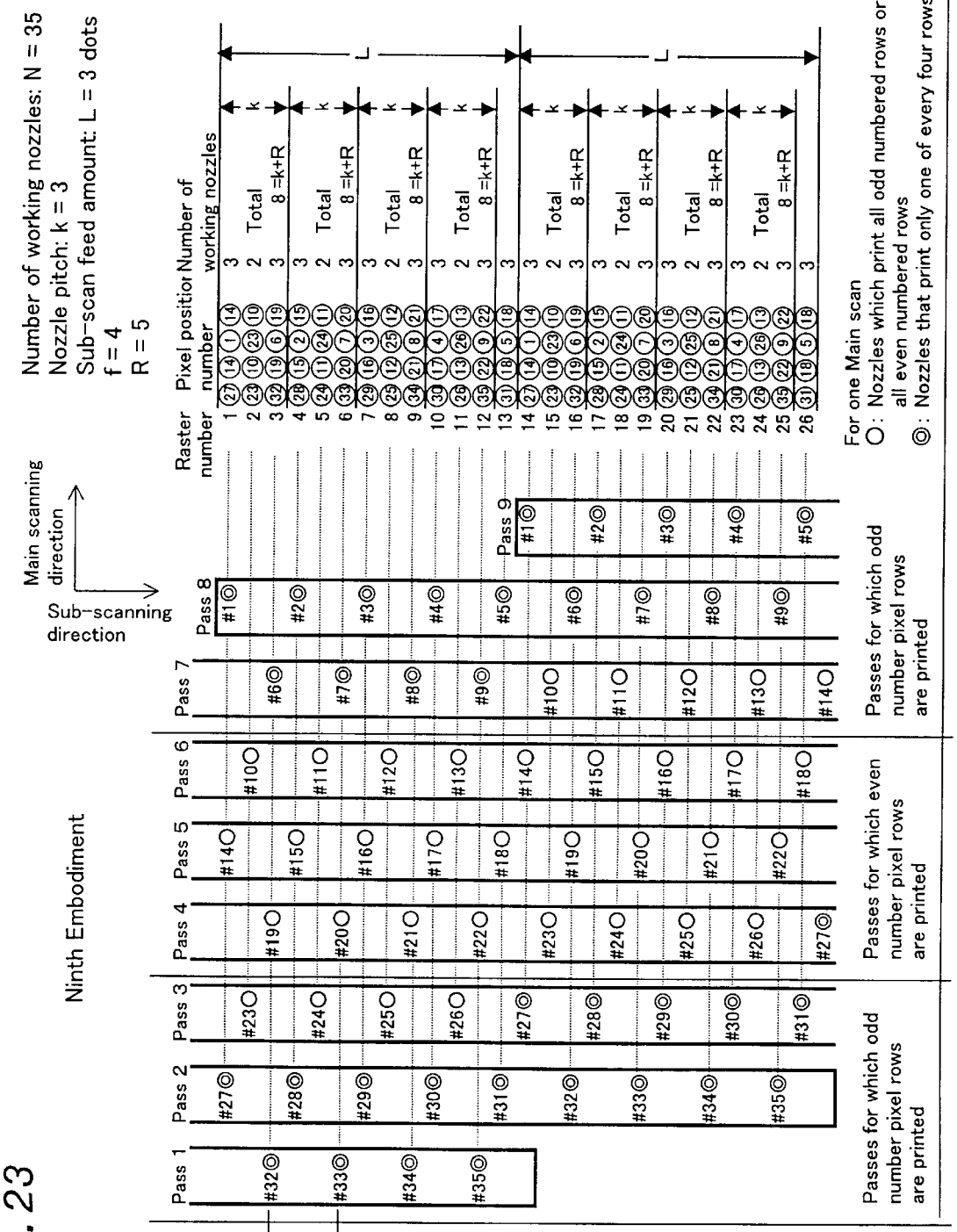
FIG. 23 is an explanatory diagram that shows the dot recording method of the ninth embodiment of the present invention.

FIG. 23 is an explanatory diagram that shows the dot recording method of a ninth embodiment of the present invention. With this ninth embodiment, other than the fact that R is 5, the parameters are the same as the eight embodiments. For this ninth embodiment as well, the number of working nozzles for recording each raster line group is fixed, and low frequency color irregularity is eliminated.

Figure 24:
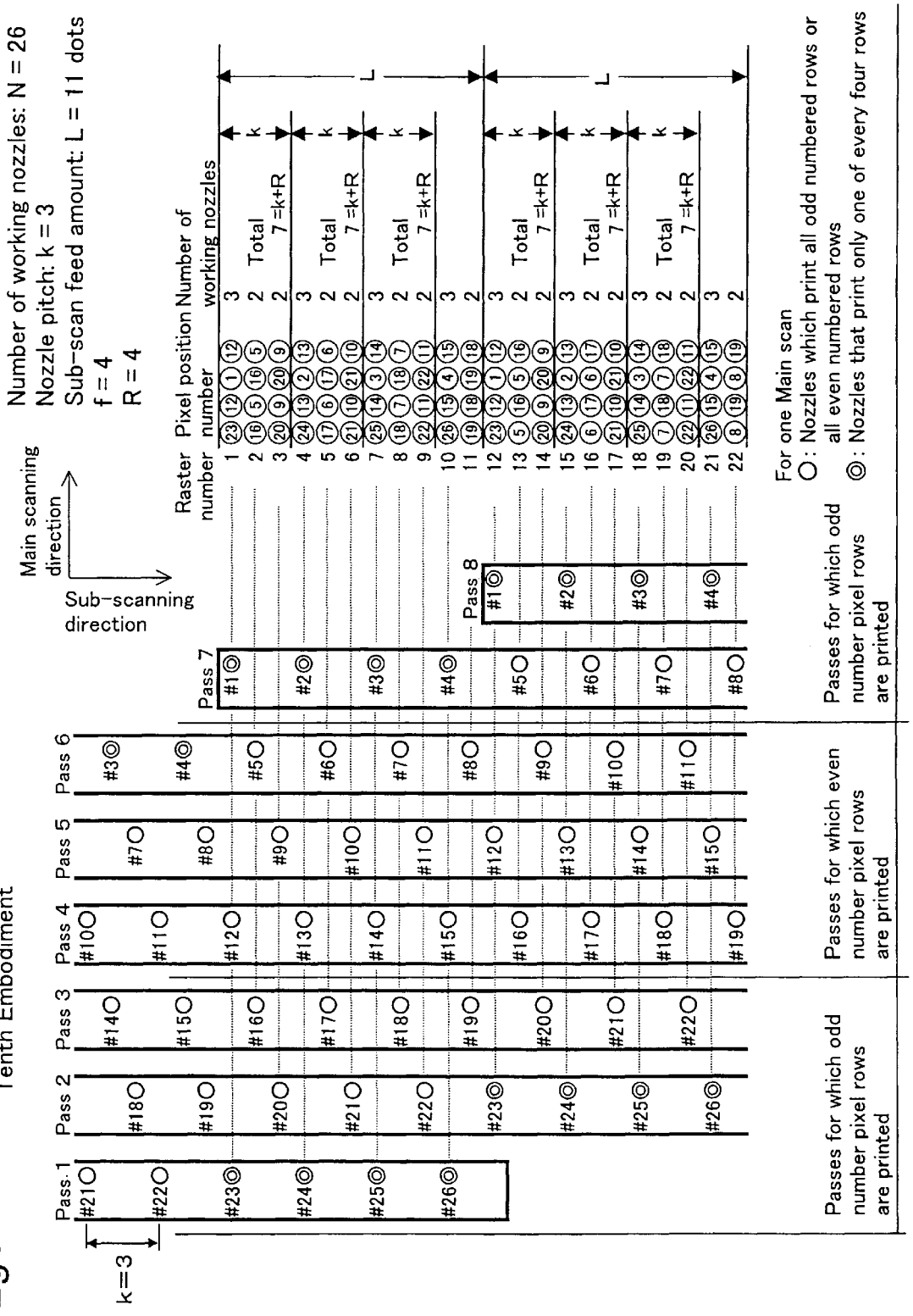
FIG. 24 is an planatory diagram that shows the dot recording method of the tent embodiment of the present invention.

FIG. 24 is an explanatory diagram that shows the dot recording method of a tenth embodiment of the present invention. This tenth embodiment is the same as the eight embodiment described above except for the fact that "−1" is used as the value of the second term "±g" of equation (1). However, with this embodiment as well, the raster recording nozzle count in the raster line group is fixed at 3, 2, and 2, so low frequency color irregularity is eliminated.

Also, with this tenth embodiment, −1 is selected as the value of the term "±g" of equation (1), so one raster line is missing from the raster line groups, and the fourth group in the range of sub-scan feed amount L is not complete. In other words, the tenth and eleventh raster lines are the first and second raster lines of the fourth group that were supposed to form, and its third raster line is missing.

Rounding up or rounding down can be used for rounding operator Rd [ ] of the second term of equation (2). Nozzle count N must be an integer, so the rounding operator is used to make the calculation result an integer. This rounding up or rounding down generally affects the raster overlap count on the raster lines outside the complete raster line groups, such as surplus raster lines and raster lines in the partially missing raster line group. For example, for the eighth embodiment, rounding down is used for Rd and the nozzle count N is 30, so the #13 raster line is recorded by two nozzles. However, if rounding up is used for Rd and the nozzle count N is 31, then the #13 raster line is recorded by three nozzles. In addition, for example, for the tenth embodiment, rounding up is used for Rd and the nozzle count is 26, so the #10 raster line is recorded by three nozzles. However, when rounding down is used for Rd and the nozzle count N is 25, raster line #10 is recorded by two nozzles.

This rounding up or rounding down may also affect the number of raster overlap count outside this surplus rasters and partially missing raster line groups. For example, rounding up is used with the ninth embodiment (FIG. 23) described above, but if rounding down is used, rather than the #13 raster line that is the surplus raster, the overlap count of the adjacent #12 raster line will decrease. However, in this case, the number of working nozzles for the raster line group will decrease, but the overlap count of the adjacent #13 raster line is 3, so the existence of this raster line must be considered. When we consider replacing this #13 raster line with the #12 raster line, which is in a position so close that it is almost unrecognizable by the human eye, the nozzle count used for recording this raster line group is essentially equal to the other raster line groups. As a result, in this kind of case as well, low frequency color irregularity is eliminated.

As explained above, with constant feed established by equation (1) while limiting nozzle count N by equation (2), it is possible to make the total nozzle count used for each raster line group essentially equal, and thus low frequency color irregularity is eliminated, making it possible to improve image quality.

This kind of feature exhibits significant effects especially with bi-directional printing for which main scanning is performed in both directions. In other words, as described above, for bi-directional printing, with the outgoing pass, each color dot is formed on each raster line in the sequence $K_D$, $C_D$, $C_L$, $M_D$, $M_L$, and $Y_D$. Meanwhile, conversely with the return pass, each color dots are formed on each raster line in the sequence $Y_D$, $M_L$, $M_D$, $C_L$, $C_D$, and $K_D$. Because of this, with the raster lines recorded by the outgoing pass and the raster lines recorded by the return pass, it is possible to see a difference in color. However, the degradation of image caused by this color difference in the low frequency is also suppressed by this kind of feature.

Figure 25:
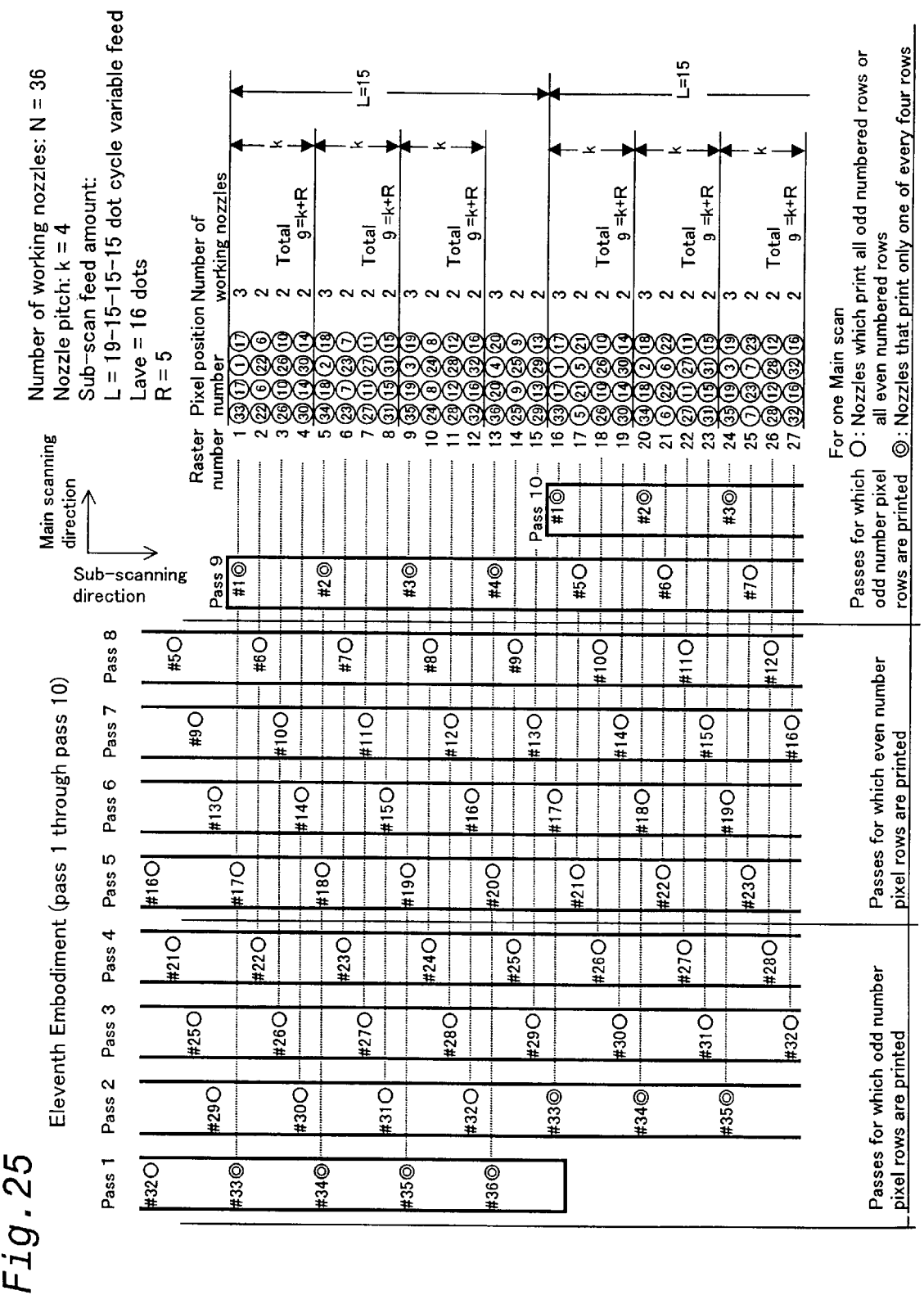
FIG. 25 an explanatory diagram that shows the dot recording method (pass 1 to pass 10) of the eleventh embodiment of the present invention.
Figure 27:
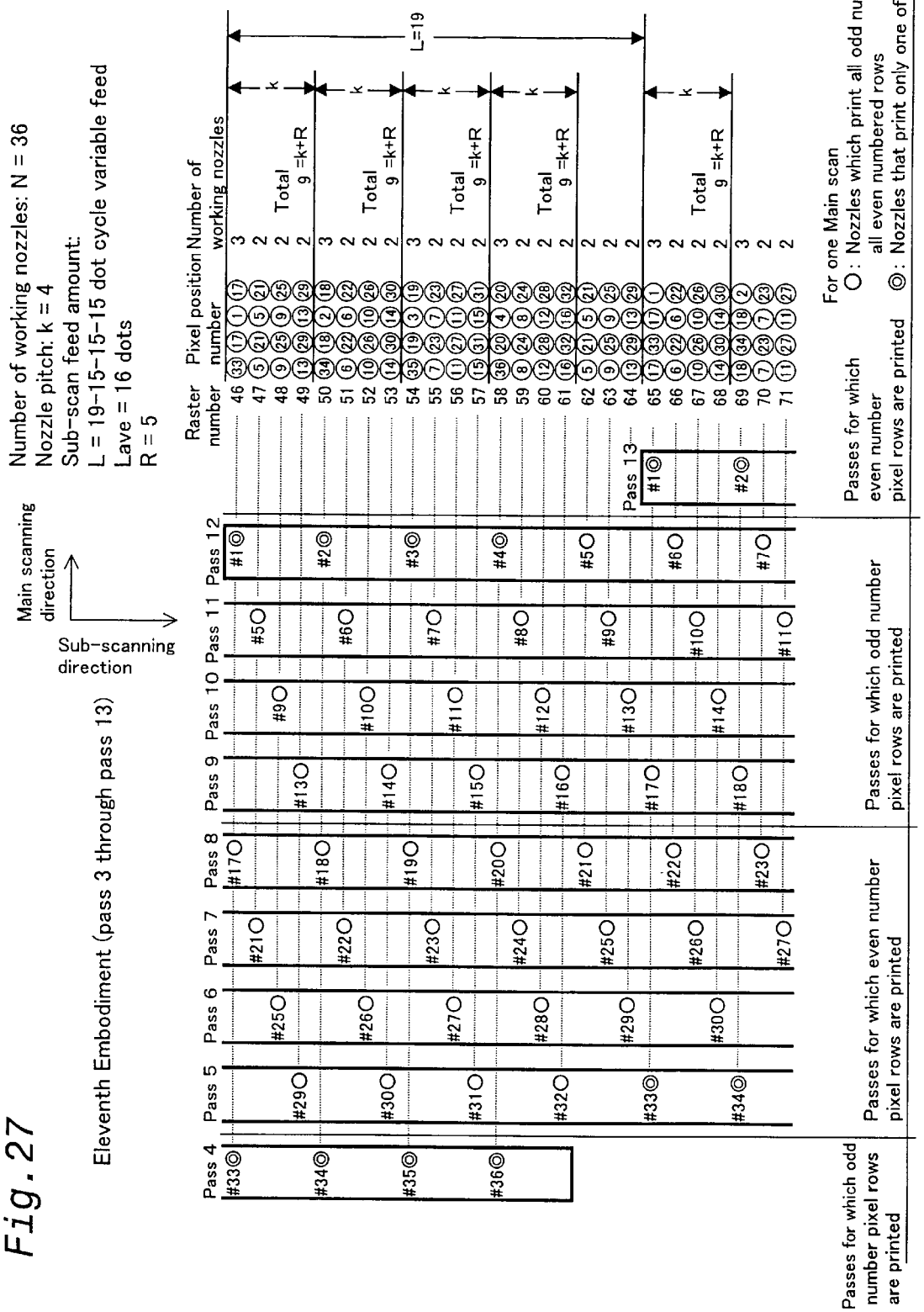
FIG. 27 is an explanatory diagram that shows the dot recording method (pass 3 to pass 13) of the eleventh embodiment of the present invention.

FIGS. 25 through 27 are explanatory diagrams that show the dot recording method of an eleventh embodiment of the present invention. The difference from the eighth through tenth embodiments is the fact that the sub-scan feed is variable feed. With variable feed as well, when sub-scan feed amount L gets larger, low frequency color irregularity can occur the same as with constant feed. This color irregularity can also be removed by setting the nozzle count N for one color so as to satisfy equations (3) and (4) below.

$$L = Lave \pm g \tag{3}$$

$$N = Lave + Rd[R \times Lave \div k] \tag{4}$$

Here, g is a positive integer that is 1 or greater and k or less, Lave is the average value of sub-scan feed amount L of one cycle, and R is an integer that is greater than k but is not an integral multiple of k.

With this eleventh embodiment, sub-scan feed is done by variable feed of 19–15–15–15 dot cycles. Therefore, average sub-scan feed amount Lave is (19+15+15+15)÷4, which is 15. Meanwhile, nozzle pitch k is 4. R is selected as any integer that is 5 or greater but not an integral multiple of 4, and in this case, 5 is selected. As a result, nozzle count N is set to 36.

With this eleventh embodiment, raster line groups constructed from k raster lines are formed, but the total nozzle count used to record for each raster line group are all equal to 9. This eliminates low frequency color irregularity. However, with constant feed, the nozzle pattern is repeated in a range of one sub-scan feed amount L, but with variable feed, it is repeated in a range of one cycle of scans. Following, we will explain the nozzle pattern for one cycle of sub-scan feed.

FIG. 25 shows pass 1 through pass 10 of the eleventh embodiment. Here, we will focus on the raster lines in the range from the raster line recorded by the #1 nozzle on pass 9 to the raster line recorded by the #1 nozzle on pass 10, in other words, the #1 to #15 raster lines. Raster lines #1 through #15, which corresponds to the range of the sub-scan feed of 15 dots before pass 10, are divided into three raster line groups recorded by an equal number of 9 nozzles and three residual raster lines that were originally supposed to be fourth raster line group. The reason that one raster line is missing from the fourth raster line group is that the sub-scan feed amount before pass 10 is 1 dot less than 16 dots which is the integral multiple of k that is closest to the average sub-scan feed amount Lave.

FIG. 26 shows pass 2 through pass 12 of the eleventh embodiment. As can be seen from this Figure and FIG. 25, the sub-scan feed amount before pass 11 is 15 dots, so the raster lines #16 through #30, which corresponds to the range of the sub-scan feed of 15 dots are also recorded in the same way as the raster lines from #1 through #15. Also, the raster lines from #31 through #45 are also recorded in the same way as the raster lines #1 through #15.

FIG. 27 shows pass 3 through pass 13 of the eleventh embodiment. These raster lines from #46 through #64 are formed by pass 4 through pass 12. The sub-scan feed amount before pass 13 is 19 dots, so the raster lines #46–#64 corresponding to the sub-scan feed are divided into four raster line groups recorded by an equal number of 9 nozzles and residual three raster lines. The reason that there are these three residual rasters is that the sub-scan feed before pass 13 is 19 dots which is 3 dots higher than 16 dots which is the integral multiple of k that is the closest to the average sub-scan feed amount Lave.

Figure 28:
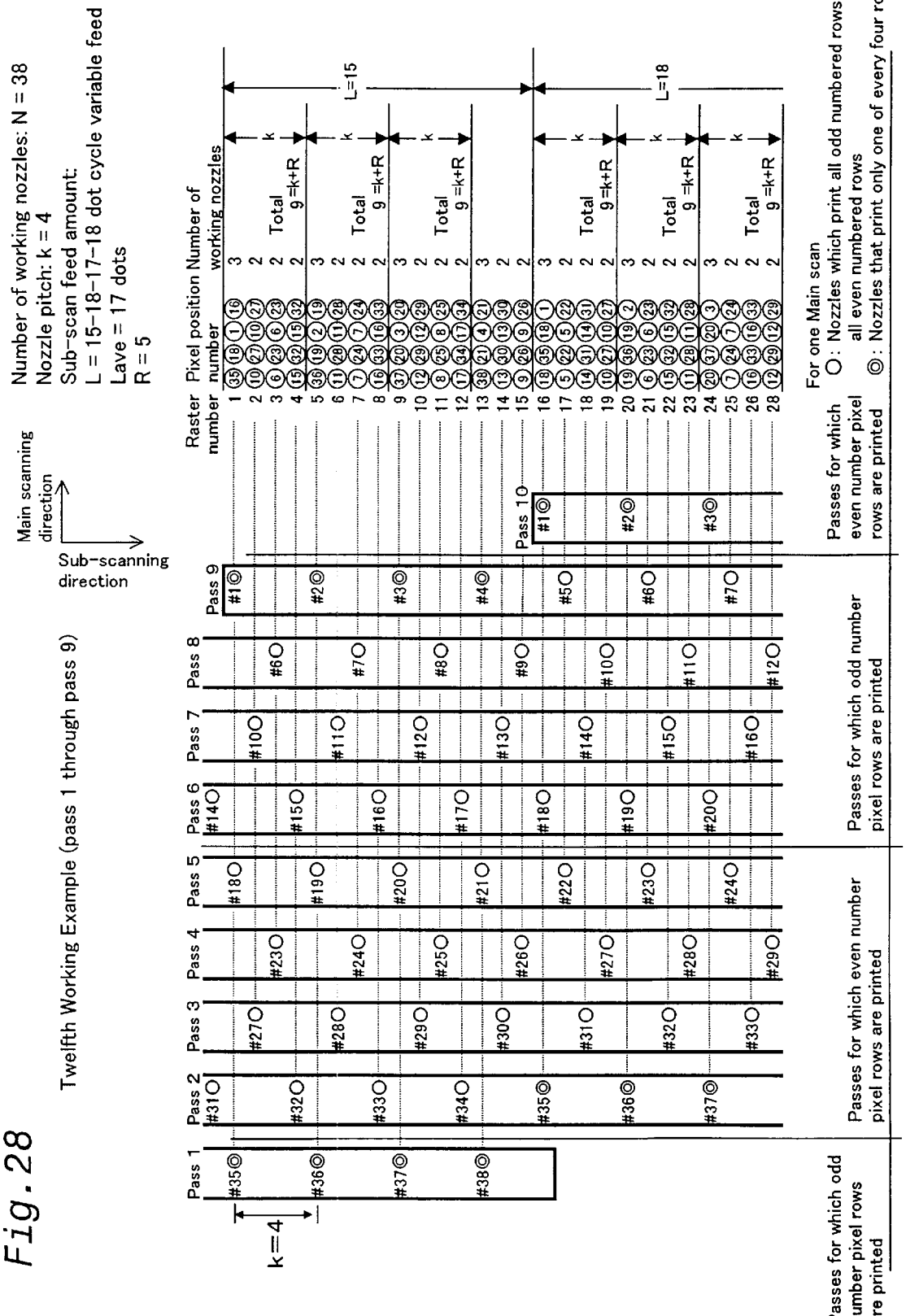
FIG. 28 is an explanatory diagram that shows the dot recording method (pass 1 to ass 9) of the twelfth embodiment of the present invention.
Figure 29:
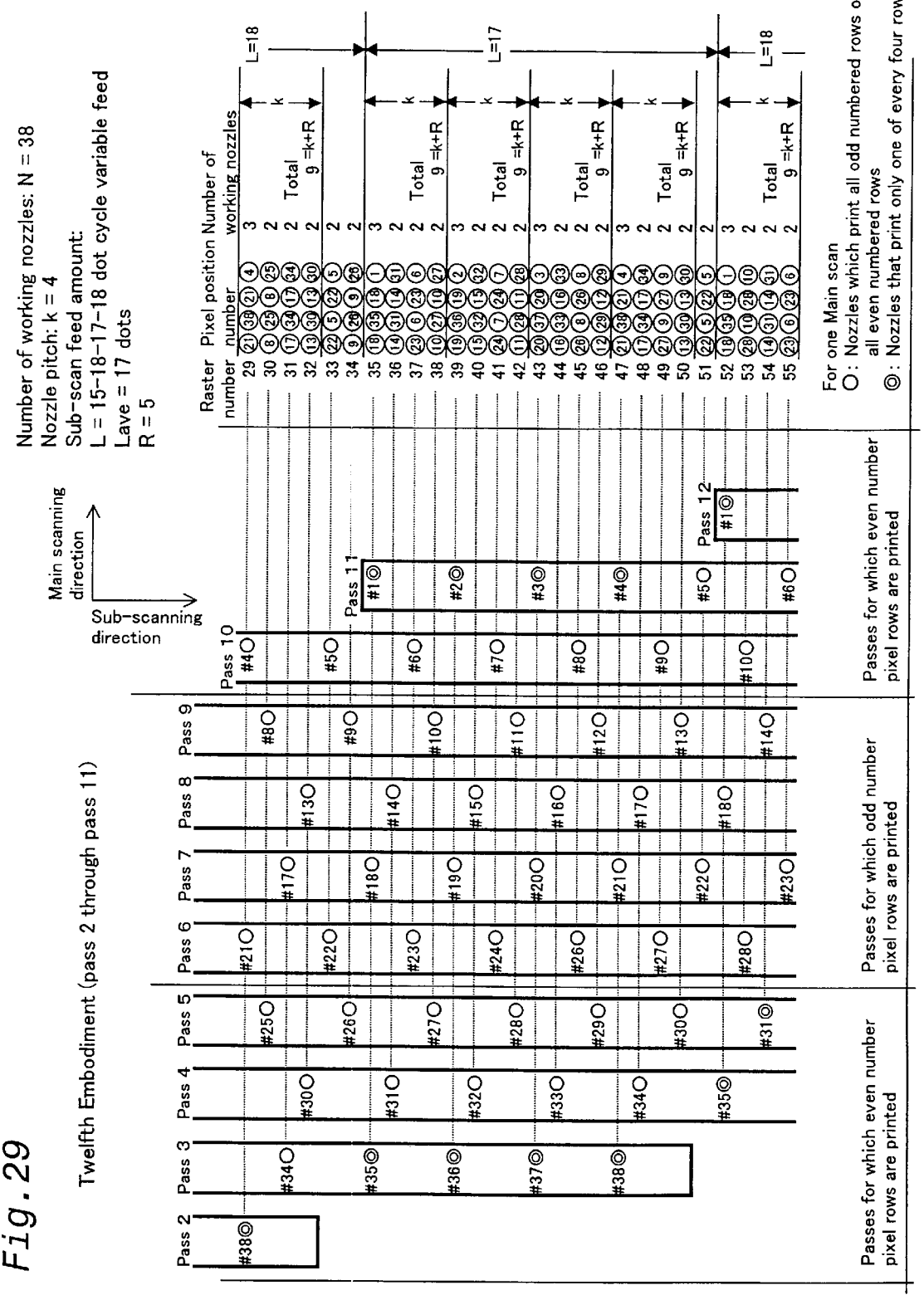
FIG. 29 is an explanatory diagram that shows the dot recording method (pass 2 to pass 11) of the twelfth embodiment of the present invention.
Figure 30:
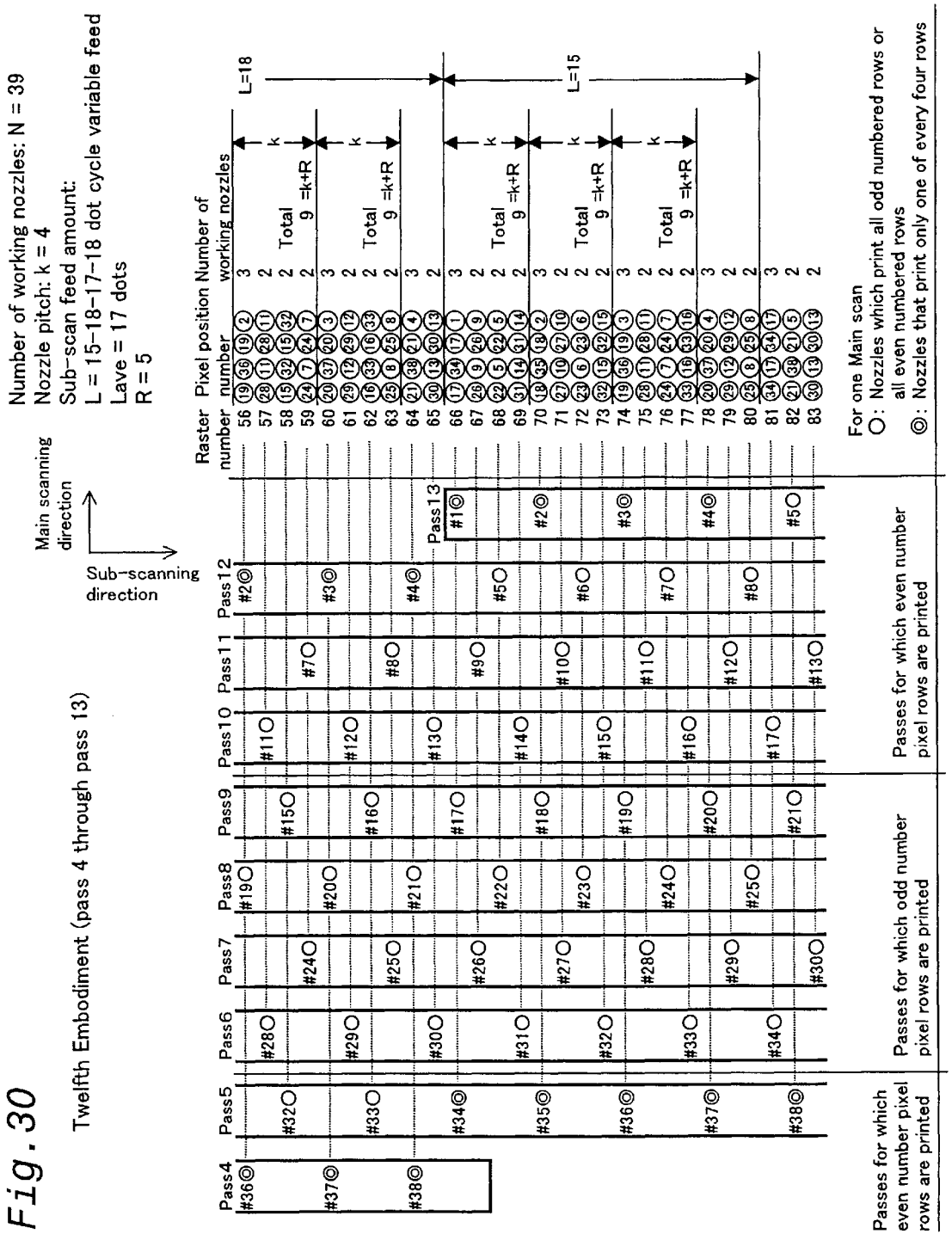
FIG. 30 is an explanatory diagram that shows the dot recording method (pass 4 to pass 12) of the twelfth embodiment of the present invention.

FIGS. 28 through 30 are explanatory Figures that show the dot recording method of a twelfth embodiment of the present invention. The difference from the eleventh embodiment is that the sub-scan feed is a 15–18–17–18 dot variable feed. With this twelfth embodiment as well, nozzle count N is set so as to satisfy equations (3) and (4). Therefore, as with the eleventh embodiment, the number of working nozzles for recording each raster line group is fixed to 9 nozzles. This eliminates low frequency color irregularity.

As explained above, even when the sub-scan feed is variable feed, by setting nozzle count N using equations (2) and (3), it is possible to make the nozzle pattern of each raster line group the same, so low frequency color irregularity is eliminated, and the image quality can be improved. Note that equation (4) is a more general form of equation (2).

G. Variation example:

The present invention can be used not only for color printing but also for black and white printing. The present invention is also applicable to printing where each pixel is reproduced with a plurality of dots of different sizes. The present invention is farther applicable to drum type printers. With a drum type printer, the drum rotation direction is the main scanning direction, and the carriage scan direction is the sub-scanning direction. Also, the present invention can be used not only for inkjet printers, but in general for dot recording apparatuses that record on the surface of a printing medium using a recording head that has multiple nozzle rows.

For the aforementioned embodiments, it is acceptable to replace part of the structure that is realized using hardware with software, and conversely, to replace part of the structure that is realized using software with hardware. For example, part or all of the functions of printer driver 96 shown in FIG. 1 can be executed by control circuit 40 within printer 20. In this case, part or all of the function of computer 90 that is the printing control apparatus that creates print data is realized by control circuit 40 of printer 20.

When realizing part or all of the functions of the present invention using software, that software (computer program) can be provided in a form stored on a computer-readable storage medium. For the present invention, "a computer-readable storage" is not limited to a portable type recording medium such as a floppy disk or CD-ROM, but also includes internal memory devices in the computer such as various types of RAM and ROM, or external memory devices connected to a computer such as a hard disk.

Although the present invention has been described and illustrated in detail, it is clearly understood that the same is by way of illustration and example only and is not to be taken by way of limitation, the spirit and scope of the present invention being limited only by the terms of the append claims.

What is claimed is:

1. A method of printing by forming ink dots on a print medium, comprising the steps of:

(a) providing a print head having a plurality of nozzles arrayed along a sub-scanning direction for ejecting same ink;

(b) allocating n(j) number of nozzles to a j-th main scan line in a selected area on the print medium where n(j) is an integer of two or more, the integer n(j) for some main scan lines being set at a different value from that for other main scan lines;

(c) positioning each of the n(j) number of nozzles on the j-th main scan line; and (d) driving each of the n(j) number of nozzles, in response to given print data, to enable the nozzle to form dots intermittently at a rate of one in m×q dot positions on the j-th main scan line during one main scan, m being an integer of 1 or more, and q being an integer of 2 or more, to thereby complete dot formation on the j-th main scan line with the n(j) number of nozzles during n(j) number of main scans.

2. A method in accordance with claim 1, wherein said step (d) comprising the steps of generating an original drive signal having a unit signal waveform, the unit signal waveform being generated periodically at a rate of one in q dot positions to provide printable dot positions at the rate of one in q dot positions on each main scan line;

on/off controlling the original drive signal with respect to each nozzle in response to the print data such that each nozzle is capable of forming dots intermittently at a rate of one in m printable dot positions on each main scan line during one main scan, thereby producing an individual drive signal for each nozzle; and supplying the individual drive signal to each nozzle.

3. A method in accordance with claim 1, wherein a sum of values of $1/(m \times q)$ for the n(j) number of nozzles is equal to one.

4. A method in accordance with claim 3, wherein the value $1/(m \times q)$ for at least one of the n(j) number of nozzles is different from that for another of the n(j) number of nozzles.

5. A method in accordance with claim 4, wherein the integer q is selected from 2 to 4 and assigned commonly to all the n(j) number of nozzles, the integer m is selected from 1 to 2 and separately assigned to each of the n(j) number of nozzles, and the integer n(j) is from 2 to 8.

6. A method in accordance with claim 1, further comprising the step of:

executing sub-scan with a constant sub-scan feed amount of L×P each time one main scan is completed, where P denotes a dot pitch corresponding to a printing resolution in the sub-scanning direction, and L is an integer of 1 or more, wherein a nozzle pitch of the plurality of nozzles in the sub-scanning direction is k×P where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets.

7. A method in accordance with claim 1, further comprising the step of:

executing sub-scan with a variable sub-scan feed amount of L×P each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is k×P where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

8. A method of printing by forming ink dots on a print medium, comprising the steps of:

(a) providing a print head having a plurality of nozzles arrayed along a sub-scanning direction for ejecting same ink;

(b) generating an original drive signal having a unit signal waveform, the unit signal waveform being generated periodically at a rate of one in q dot positions to provide printable dot positions at the rate of one in q dot positions on each main scan line, q being an integer of 2 or more;

(c) on/off controlling the original drive signal with respect to i-th nozzle of the plurality of nozzles in response to the print data such that the i-th nozzle is capable of forming dots intermittently at a rate of one in m(i) printable dot positions on each main scan line during one main scan, thereby producing an individual drive signal for each nozzle, m(i) being an integer of 1 or more, the integer m(i) for at least two nozzles being set at a different value from that for other nozzles; and (d) supplying the individual drive signal to the i-th nozzle.

9. A method in accordance with claim 8, wherein a sum of values of $1/(m(i) \times q)$ for the n(j) number of nozzles is equal to one.

10. A method in accordance with claim 9, wherein the value $1/(m(i) \times q)$ for at least one of the n(j) number of nozzles is different from that for another of the n(j) number of nozzles.

11. A method in accordance with claim 10, wherein the integer q is selected from 2 to 4 and assigned commonly to all the n(j) number of nozzles, the integer m(i) is selected from 1 to 2 and separately assigned to each of the n(j) number of nozzles, and the integer n(j) is from 2 to 8.

12. A method in accordance with claim 8, further comprising the step of:

executing sub-scan with a constant sub-scan feed amount of L×P each time one main scan is completed, where P denotes a dot pitch corresponding to a printing resolution in the sub-scanning direction, and L is an integer of 1 or more, wherein a nozzle pitch of the plurality of nozzles in the sub-scanning direction is k×P where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets.

13. A method in accordance with claim 8, further comprising the step of:

executing sub-scan with a variable sub-scan feed amount of L×P each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is k×P where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

14. A printing apparatus for forming ink dots on a print medium, comprising:

a print head having a plurality of nozzles arrayed along a sub-scanning direction for ejecting same ink;

a main scan drive mechanism configured to relatively move a selected one of the print head and the print medium to effect main scanning;

a sub-scan drive mechanism configured to relatively move a selected one of the print head and the print medium to effect sub-scanning;

a head driver configured to drive the print head to eject ink; and a controller configured to control the main scan drive mechanism, the sub-scan drive mechanism, and the head driver in response to given print data such that dot formation on a j-th main scan line in a selected area on the print medium is executed by n(j) number of nozzles during n(j) number of main scans where n(j) is an integer of two or more, each of the n(j) number of nozzles being allowed to form dots intermittently at a rate of one in m×q dot positions on the j-th main scan line during one main scan, where m is an integer of 1 or more, and q is an integer of 2 or more, to thereby complete dot formation on the j-th main scan line with the n(j) number of nozzles, the integer n(j) for some main scan lines being set at a different value from that for other main scan lines.

15. A printing apparatus in accordance with claim 14, wherein the controller comprising:

a drive signal generator configured to generate an original drive signal having a unit signal waveform, the unit signal waveform being generated periodically at a rate of one in q dot positions to provide printable dot positions at the rate of one in q dot positions on each main scan line;

a masking circuit configured to on/off control the original drive signal with respect to each nozzle in response to the print data such that each nozzle is capable of forming dots intermittently at a rate of one in m printable dot positions on each main scan line, thereby producing an individual drive signal for each nozzle and supplying the individual drive signal to each nozzle.

16. A printing apparatus in accordance with claim 14, wherein a sum of values of 1/(m×q) for the n(j) number of nozzles is equal to one.

17. A printing apparatus in accordance with claim 16, wherein the value 1/(m×q) for at least one of the n(j) number of nozzles is different from that for another of the n(j) number of nozzles.

18. A printing apparatus in accordance with claim 17, wherein the integer q is selected from 2 to 4 and assigned commonly to all the n(j) number of nozzles, the integer m is selected from 1 to 2 and separately assigned to each of the n(j) number of nozzles, and the integer n(j) is from 2 to 8.

19. A printing apparatus in accordance with claim 14, wherein the sub-scan drive mechanism is configured to execute sub-scan with a constant sub-scan feed amount of L×P each time one main scan is completed, where P denotes a dot pitch corresponding to a printing resolution in the sub-scanning direction, and L is an integer of 1 or more, wherein a nozzle pitch of the plurality of nozzles in the sub-scanning direction is k×P where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets.

20. A printing apparatus in accordance with claim 14, wherein the sub-scan drive mechanism is configured to execute sub-scan with a variable sub-scan feed amount of L×P each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is k×P where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

21. A printing apparatus for forming ink dots on a print medium, comprising:

a print head having a plurality of nozzles arrayed along a sub-scanning direction for ejecting same ink;

a drive signal generator configured to generate an original drive signal having a unit signal waveform, the unit signal waveform being generated periodically at a rate of one in q dot positions to provide printable dot positions at a rate of one in q dot positions on each main scan line, q being an integer of 2 or more;

a masking circuit configured to on/off control the original drive signal with respect to i-th nozzle of the plurality of nozzles in response to the print data such that the i-th nozzle is capable of forming dots intermittently at a rate of one in m(i) printable dot positions on each main scan line during one main scan, thereby producing an individual drive signal for each nozzle, m(i) being an integer of 1 or more, the integer m(i) for at least two nozzles being set at a different value from that for other nozzles and supplying the individual drive signal to the i-th nozzle.

22. A printing apparatus in accordance with claim 21, wherein a sum of values of 1/(m(i)×q) for the n(j) number of nozzles is equal to one.

23. A printing apparatus in accordance with claim 22, wherein the value 1/(m(i)×q) for at least one of the n(j) number of nozzles is different from that for another of the n(j) number of nozzles.

24. A printing apparatus in accordance with claim 23, wherein the integer q is selected from 2 to 4 and assigned commonly to all the n(j) number of nozzles, the integer m(i) is selected from 1 to 2 and separately assigned to each of the n(j) number of nozzles, and the integer n(j) is from 2 to 8.

25. A printing apparatus in accordance with claim 21, wherein the sub-scan drive mechanism is configured to execute sub-scan with a constant sub-scan feed amount of L×P each time one main scan is completed, where P denotes a dot pitch corresponding to a printing resolution in the sub-scanning direction, and L is an integer of 1 or more, wherein a nozzle pitch of the plurality of nozzles in the sub-scanning direction is k×P where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets.

26. A method in accordance with claim 21, wherein the sub-scan drive mechanism is configured to execute sub-scan with a variable sub-scan feed amount of L×P each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is k×P where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

27. A printing control apparatus for generating print data to be supplied to a printing unit to perform printing, the printing unit comprising a print head having a plurality of nozzles arrayed along a sub-scanning direction for ejecting same ink, the printing control apparatus comprising:

a print data generator configured to generate the print data to effect printing such that dot formation on a j-th main scan line in a selected area on the print medium is executed by n(j) number of nozzles during n(j) number of main scans where n(j) is an integer of two or more, each of the n(j) number of nozzles being allowed to form dots intermittently at a rate of one in m×q dot positions on the j-th main scan line during one main scan, where m is an integer of 1 or more, and q is an integer of 2 or more, to thereby complete dot formation on the j-th main scan line with the n(j) number of nozzles, the integer n(j) for some main scan lines being set at a different value from that for other main scan lines.

28. A printing control apparatus in accordance with claim 27, wherein a sum of values of 1/(m×q) for the n(j) number of nozzles is equal to one.

29. A printing control apparatus in accordance with claim 28, wherein the value 1/(m×q) for at least one of the n(j) number of nozzles is different from that for another of the n(j) number of nozzles.

30. A printing control apparatus in accordance with claim 29, wherein the integer q is selected from 2 to 4 and assigned commonly to all the n(j) number of nozzles, the integer m is selected from 1 to 2 and separately assigned to each of the n(j) number of nozzles, and the integer n(j) is from 2 to 8.

31. A printing control apparatus in accordance with claim 27, wherein the printing unit further comprises a sub-scan drive mechanism configured to execute sub-scan with a constant sub-scan feed amount of L×P each time one main scan is completed, where P denotes a dot pitch corresponding to a printing resolution in the sub-scanning direction, and L is an integer of 1 or more, wherein a nozzle pitch of the plurality of nozzles in the sub-scanning direction is k×P where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets.

32. A printing control apparatus in accordance with claim 27, wherein the printing unit further comprises a sub-scan drive mechanism configured to execute sub-scan with a variable sub-scan feed amount of L×P each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is k×P where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

33. A printing control apparatus for generating print data to be supplied to a printing unit comprising a print head, a drive signal generator, and a plurality of analog switches, the print head having a plurality of nozzles arrayed along a sub-scanning direction for ejecting same ink, the drive signal generator generating an original drive signal having a unit signal wave form being generated periodically at a rate of one in q dot positions to provide printable dot positions at a rate of one in q dot positions on each main scan line, q being an integer of 2 or more, the analog switches on/off controlling the original drive signal with respect to each nozzle in response to the print data, the printing control apparatus comprising:

a print data generator configured to generate the print data to effect printing such that the i-th nozzle of the plurality of the nozzles is capable of forming dots intermittently at a rate of one in m(i) printable dot positions on each main scan line during one main scan, thereby producing an individual drive signal for each nozzle, m(i) being an integer of 1 or more, the integer m(i) for at least two nozzles being set at a different value from that for other nozzles.

34. A printing control apparatus in accordance with claim 33, wherein a sum of values of $1/(m(i) \times q)$ for the n(j) number of nozzles is equal to one.

35. A printing control apparatus in accordance with claim 34, wherein the value $1/(m(i) \times q)$ for at least one of the n(j) number of nozzles is different from that for another of the n(j) number of nozzles.

36. A printing control apparatus in accordance with claim 35, wherein the integer q is selected from 2 to 4 and assigned commonly to all the n(j) number of nozzles, the integer m(i) is selected from 1 to 2 and separately assigned to each of the n(j) number of nozzles, and the integer n(j) is from 2 to 8.

37. A printing control apparatus in accordance with claim 33, wherein the printing unit further comprises a sub-scan drive mechanism configured to execute sub-scan with a constant sub-scan feed amount of $L \times P$ each time one main scan is completed, where P denotes a dot pitch corresponding to a printing resolution in the sub-scanning direction, and L is an integer of 1 or more, wherein a nozzle pitch of the plurality of nozzles in the sub-scanning direction is $k \times P$ where k is an integer of 3 or more, and wherein L and k satisfy equations (1) and (2):

$$L = f \times k \pm g \quad (1)$$

$$N = L + Rd[R \times L \div k] \quad (2)$$

where N denotes a number of working nozzles during one main scan, N being an integer of 3 or more, f is an integer of 2 or more, g is an integer that is at least one and less than k, R is an integer that is larger than k and is not an integral multiple of k, and an operator Rd[ ] denotes a rounding operation for rounding a decimal part of a value in the brackets.

38. A printing control apparatus in accordance with claim 33, wherein the printing unit further comprises a sub-scan drive mechanism configured to execute sub-scan with a variable sub-scan feed amount of $L \times P$ each time one main scan is completed, where P denotes a dot pitch corresponding to a printing resolution in the sub-scanning direction, and L is a cyclically changing integer of 1 or more, wherein a nozzle pitch of the plurality of nozzles in the sub-scanning direction is $k \times P$ where k is an integer of 3 or more, and wherein L and k satisfy equations (3) and (4):

$$L = Lave \pm g \quad (3)$$

$$N = Lave + Rd[R \times Lave \div k] \quad (4)$$

where N denotes a number of working nozzles during one main scan, N being an integer of 3 or more, g is an integer that is at least one and less than k, R is an integer that is larger than k and is not an integral multiple of k, Lave denotes an average value of L in one cycle, and an operator Rd[ ] denotes a rounding operation for rounding a decimal part of a value in the brackets.

39. A computer program product for causing a computer to generate print data to be supplied to a printing unit to perform printing, the printing unit comprising a print head having a plurality of nozzles arrayed along a sub-scanning direction for ejecting same ink, the computer program product comprising:

a computer readable medium; and a computer program stored on the computer readable medium, the computer program comprising:

a program for causing the computer to generate the print data to effect printing such that dot formation on a j-th main scan line in a selected area on the print medium is executed by n(j) number of nozzles during n(j) number of main scans where n(j) is an integer of two or more, each of the n(j) number of nozzles being allowed to form dots intermittently at a rate of one in $m \times q$ dot positions on the j-th main scan line during one main scan, where m is an integer of 1 or more, and q is an integer of 2 or more, to thereby complete dot formation on the j-th main scan line with the n(j) number of nozzles, the integer n(j) for some main scan lines being set at a different value from that for other main scan lines.

40. A computer program product for causing a computer to generate print data to be supplied to a printing unit comprising a print head, a drive signal generator, and a plurality of analog switches, the print head having a plurality of nozzles arrayed along a sub-scanning direction for ejecting same ink, the drive signal generator generating an original drive signal having a unit signal wave form being generated periodically at a rate of one in q dot positions to provide printable dot positions at a rate of one in q dot positions on each main scan line, q being an integer of 2 or more, the analog switches on/off controlling the original drive signal with respect to each nozzle in response to the print data, the computer program product comprising:

a computer readable medium; and a computer program stored on the computer readable medium, the computer program comprising:

a program for causing the computer to generate the print data to effect printing such that i-th nozzle of the plurality of nozzles is capable of forming dots intermittently at a rate of one in m(i) printable dot positions on each main scan line, thereby producing an individual drive signal for each nozzle, m(i) being an integer of 1 or more, the integer m(i) for at least two nozzles being set at a different value from that for other nozzles.

* * * * *